(12) United States Patent
Carrie

(10) Patent No.: US 7,644,238 B2
(45) Date of Patent: Jan. 5, 2010

(54) TIMESTAMP BASED TRANSACTIONAL MEMORY

(75) Inventor: Susan E. Carrie, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 11/757,041

(22) Filed: Jun. 1, 2007

(65) Prior Publication Data

US 2008/0301378 A1  Dec. 4, 2008

(51) Int. Cl.
*G06F 12/00* (2006.01)
(52) U.S. Cl. .................... 711/147; 711/151; 711/113; 711/E12.023; 707/2
(58) Field of Classification Search .............. 711/147
See application file for complete search history.

(56) References Cited

U.S. PATENT DOCUMENTS

| | | | |
|---|---|---|---|
| 5,495,570 A | 2/1996 | Heugel et al. | |
| 5,530,851 A * | 6/1996 | Fortier ........................ | 707/2 |
| 5,845,071 A | 12/1998 | Patrick et al. | |
| 6,209,064 B1 | 3/2001 | Weber | |
| 6,516,372 B1 | 2/2003 | Anderson et al. | |
| 6,754,657 B2 * | 6/2004 | Lomet ........................ | 707/8 |
| 6,865,651 B2 | 3/2005 | Woodward | |
| 7,017,160 B2 | 3/2006 | Martin et al. | |
| 7,069,306 B1 | 6/2006 | Lenoski et al. | |
| 7,085,866 B1 | 8/2006 | Hobson et al. | |
| 7,340,569 B2 * | 3/2008 | Goodman et al. ........... | 711/151 |
| 7,395,382 B1 * | 7/2008 | Moir ........................ | 711/147 |
| 2004/0236746 A1 * | 11/2004 | Lomet ........................ | 707/9 |
| 2005/0086446 A1 | 4/2005 | McKenney | |
| 2006/0085591 A1 | 4/2006 | Kumar | |

FOREIGN PATENT DOCUMENTS

EP  1008940 A2  6/2000

OTHER PUBLICATIONS

Jelica Protic, "Distributed Shared Memory: Concepts and Systems", IEEE Parallel and Distributed Technology, 1996 IEEE, pp. 63-79.

(Continued)

*Primary Examiner*—Reginald G Bragdon
*Assistant Examiner*—Arvind Talukdar
(74) *Attorney, Agent, or Firm*—Vierra Magen Marcus & DeNiro LLP

(57) ABSTRACT

A hardware implemented transactional memory system includes a mechanism to allow multiple processors to access the same memory system. A set of timestamps are stored that each correspond to a region of memory. A time stamp is updated when any memory in its associated region is updated. For each memory transaction, the time at which the transaction begins is recorded. Write operations that are part of a transaction are performed by writing the data to temporary memory. When a transaction is to be recorded, the hardware automatically commits the transaction by determining whether the timestamps associated with data read for the transaction are all prior to the start time for the transaction. In this manner, the software need not check the data for all other processes or otherwise manage collision of data with respect to different processes. The software need only identify which reads and writes are part of a transaction.

20 Claims, 11 Drawing Sheets

OTHER PUBLICATIONS

Kourosh Gharachorloo, "Memory Consistency and Event Ordering in Scalable Shared-Memory Multiprocessors", Computer Systems Laboratory, 1990 IEEE, pp. 15-26, Stanford University, CA.

Lance Hammond, "Transactional Memory Coherence and Consistency", International Conference on Computer Architecture, Proceedings of the 31st Annual International Symposium on Computer Architecture, 2004, pp. 102, IEEE Computer Society.

Austen McDonald, "Architectural Semantics for Practical Transactional Memory", ACM SIGARCH Computer Architecture News, 2006, pp. 53-65, vol. 34, Issue 2, IEEE Computer Society.

Dave Dice, "Transactional Locking II", Sun Microsystems Laboratories, Burlington, MA, home.comcast.net/~pjbishop/Dave/GVTL-TL2-Disc06-060711-Camera.pdf.

Kevin E. Moore, "LogTM: Log-based Transactional Memory", 12th Annual International Symposium on High Performance Computer Architecture, Feb. 2006, Austin, TX, USA.

Maurice Herlihy, "Transactional Memory: Architectural Support for Lock-Free Data Structures", International Conference on Computer Architecture, Proceedings of the 20th Annual International Symposium on Computer Architecture, 1993, pp. 289-300, ACM Press, New York, NY, USA.

Tim Harris, "Composable Memory Transactions", Tenth Principles and Practice of Parallel Programming, 2005, pp. 48-60, ACM Press, New York, NY, USA.

Sanjeev Kumar, "Hybrid Transactional Memory", Eleventh Principles and Practice of Parallel Programming, 2006, pp. 209-220, ACM Press, New York, NY, USA.

Brian D. Carlstrom, "The Software Stack for Transactional Memory: Challenges and Opportunities", STMCS, Mar. 26, 2006, New York, NY, USA.

Jaewoong Chung, "Tradeoffs in Transactional Memory Virtualization", 12th Architecture Support for Programming Languages and Operating Systems, 2006, pp. 371-381, ACM Press New York, NY, USA.

"Virtualizing Transactional Memory", International Conference on Computer Architecture, Proceedings of the 32nd Annual International Symposium on Computer Architecture, 2005, pp. 494-505, IEEE Computer Society.

* cited by examiner

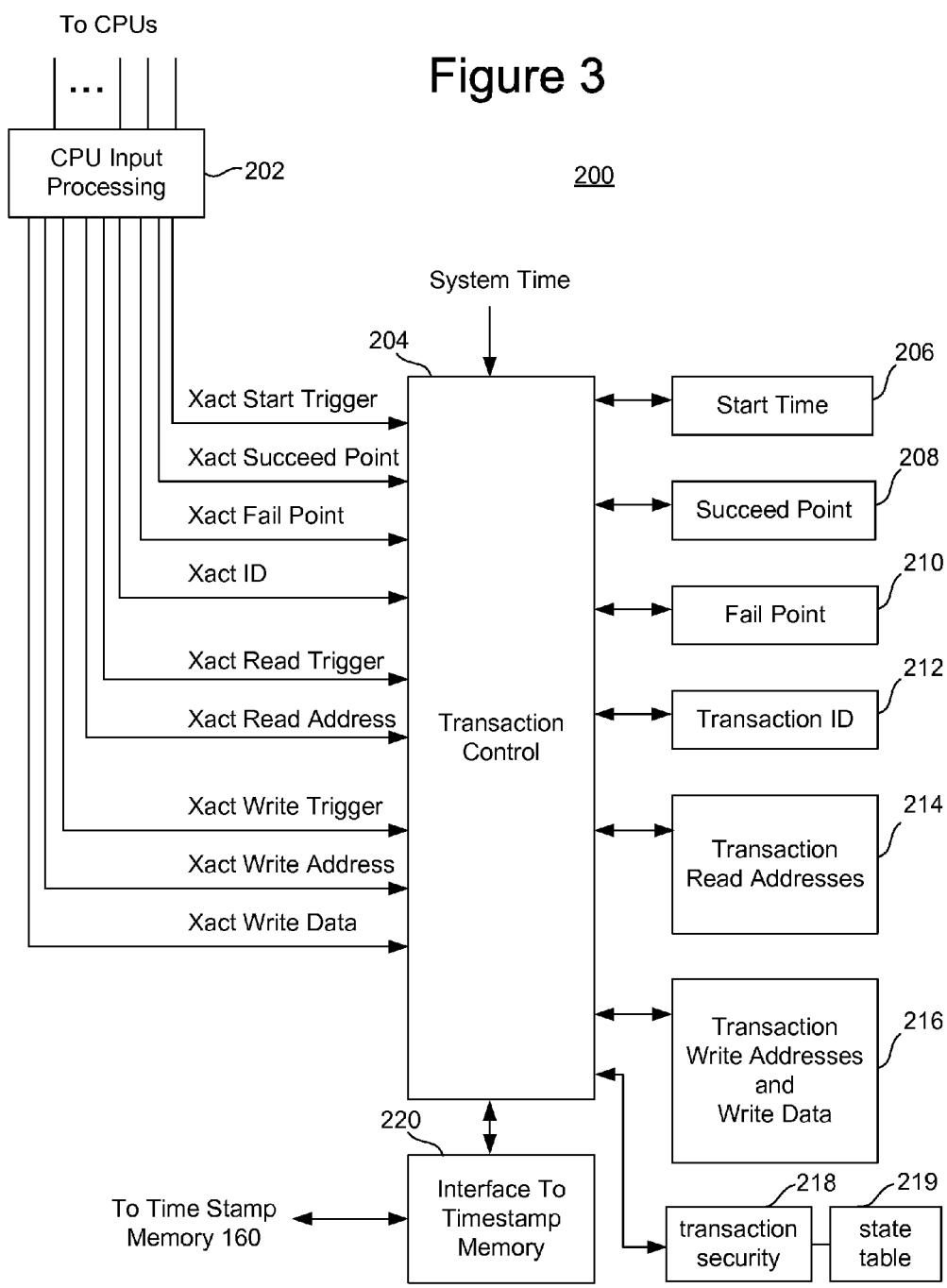

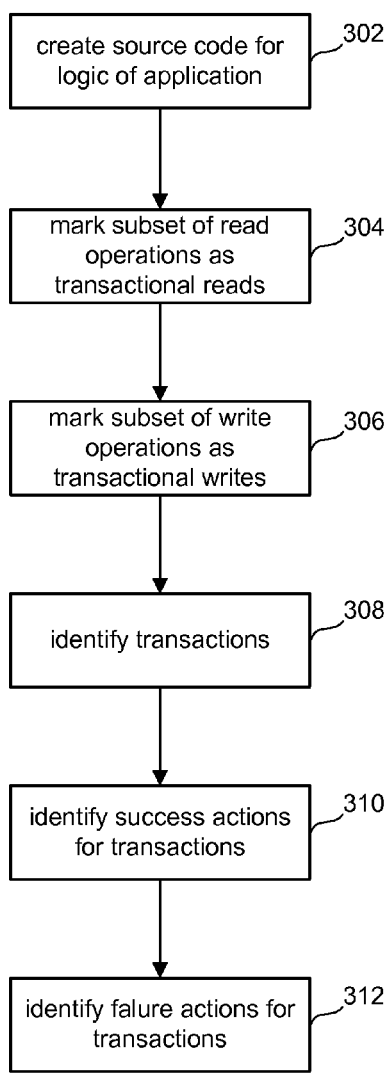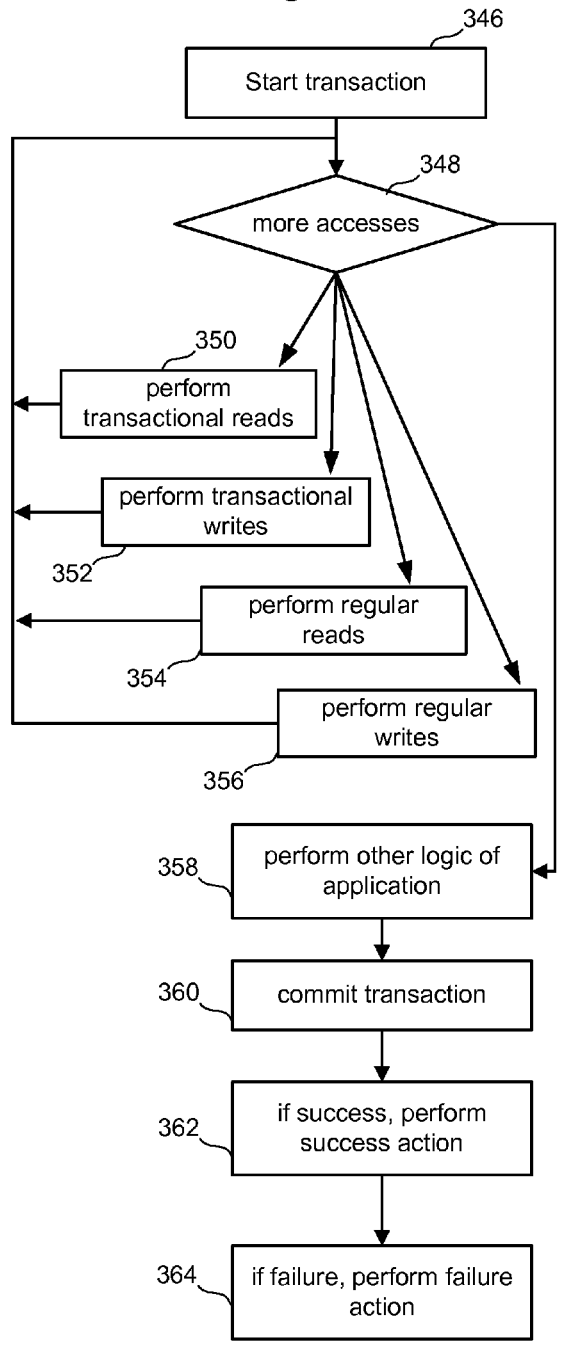

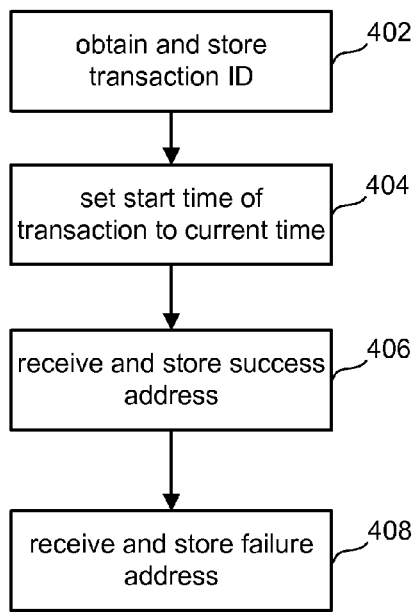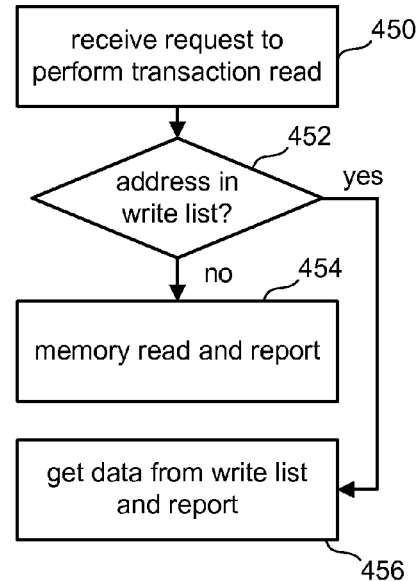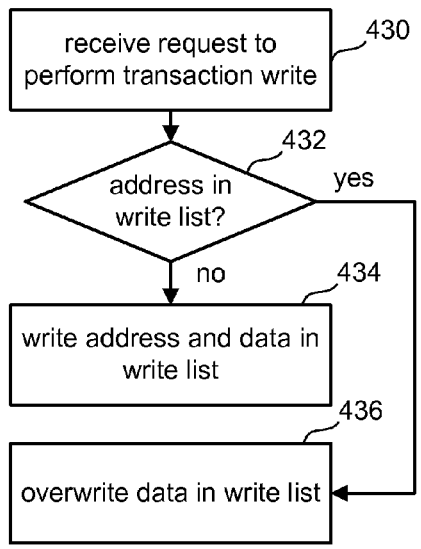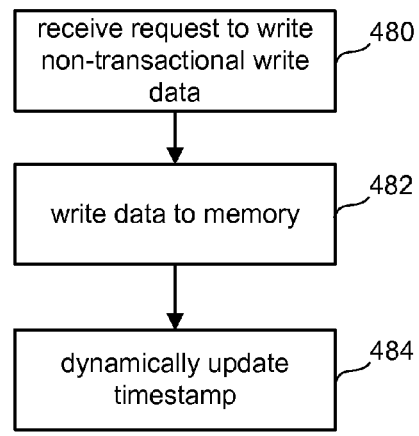

Figure 7

| Full Accuracy Time Tick Value | k-1 | k | k+1 | ••• | k+m-1 | k+m | k+m+1 | ••• | k+2m-1 | k+2m | k+2m+1 |
|---|---|---|---|---|---|---|---|---|---|---|---|
| Reduced Accuracy Time Tick Value | n-1 | n | n | ••• | n | n+1 | n+1 | ••• | n+1 | n+2 | n+3 |
| Transaction Start Time Tick Value | n-1 | n | n | ••• | n | n+1 | n+1 | ••• | n+1 | n+2 | n+3 |
| Memory Write Time Tick Value | n | n+1 | n+1 | ••• | n+1 | n+2 | n+2 | ••• | n+2 | n+3 | n+3 |
| Alternative Memory Write Time Tick Value | n | n | n+1 | ••• | n+1 | n+1 | n+2 | ••• | n+2 | n+2 | n+3 |

If memory write occurs after transaction start timed then
Memory Write Time Tick Value > Transaction Start Time Tick Value

TIMESTAMP BASED TRANSACTIONAL MEMORY

BACKGROUND

To increase performance of computing systems, multi-processor designs have been proposed. To most effectively take advantage of a multi-processor design, software developers seek to introduce parallelism into their applications for operations which do not conflict with respect to accessing memory. Thus, multiple processors are able to access the same storage system.

One system that provides for concurrent use of a storage system (e.g., main memory), while maintaining data integrity, includes the use of locks. However, programming effective locks is very difficult to do.

Transactional memory has shown promise as a mechanism for simplifying parallel programming. However, previous implementations have been costly, particularly in terms of complexity. Many approaches require a memory transaction to be compared with all other memory transactions occurring in the system. This requires searching potentially large descriptions of transactions, which causes performance and storage penalties associated with comparing each piece of data accessed.

SUMMARY

A hardware implemented transactional memory system is proposed that includes a mechanism to allow multiple processors to access the same memory system. A set of timestamps are stored that each correspond to a region of memory. A time stamp is updated when any memory in its associated region is updated. For each memory transaction, the time at which the transaction begins is recorded. Write operations that are part of a transaction are performed by writing the data to temporary memory. When a transaction is to be recorded, the hardware automatically commits the transaction by determining whether the timestamps associated with data read for the transaction are all prior to the start time for the transaction. In this manner, the software need not check the data for all other processes or otherwise manage collision of data with respect to different processors.

One embodiment includes a main memory system, multiple processing units in communication with the main memory system, a transaction processing control circuit in communication with the multiple processing units, a first memory circuit in communication with the transaction processing circuit, and a second memory circuit in communication with the transaction processing circuit. The processing units execute software that performs transactions of memory accesses for the main memory system. The transactions include transactional write operations and transactional read operations. The transaction processing circuit stores temporary write data in the first memory circuit in response to transactional write operations. The second memory circuit stores timestamps. Each time stamp is associated with data for the main memory system. The transactional processing system commits a particular transaction by allowing data from the first memory circuit corresponding to a transaction write for the particular transaction to be written to the main memory system if a set of timestamps that are stored in the second memory system and correspond to transaction reads for the particular transaction are prior to a start time for the particular transaction.

Another embodiment includes a main memory system, multiple processing units in communication with the main memory system, an interface circuit in communication with the processing units and the main memory system, a transactional control circuit in communication with the interface circuit, a memory circuit (in communication with the transactional control circuit) that stores transactional start times, a memory circuit (in communication with the transactional control circuit) that stores transactional identifications, a memory circuit (in communication with the transactional control circuit) that stores transactional read addresses, one or more memory circuits (in communication with the transactional control circuit) that store transactional write addresses and transactional write data, and a memory circuit (in communication with the transactional control circuit) that stores timestamps associated with the main memory system. The processing units execute software that performs transactions of memory accesses for the main memory system. The transactions includes transactional reads and transactional writes.

One example implementation includes storing read addresses in response to transactional reads, storing write data in a temporary condition in response to transactional writes, using hardware to create timestamps and associate the timestamps with memory, and committing transactions. The committing of transactions is performed by hardware without the software in the computing system checking other processes' data to avoid collisions of memory accesses. Additionally, in one embodiment, the timestamps are not referenced by software.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a block diagram of one embodiment of a circuit for processing memory transactions.

FIG. 4 is a flow chart describing one embodiment of a process for creating an application that is run on one or more CPUs and makes use of transactional memory.

FIG. 5 is a flow chart describing one embodiment of a process for executing an application on one or more CPUs that makes use of transactional memory.

FIG. 6A is a flow chart describing one embodiment of a process for starting a transaction. In one embodiment, the process of FIG. 6A is performed by hardware without being performed by software.

FIG. 6B is a flow chart describing one embodiment of a process for performing a transaction write operation in response to a request from software. In one embodiment, the process of FIG. 6B is performed by hardware without being performed by software.

FIG. 6C is a flow chart describing one embodiment of a process for performing a transaction read operation in response to a request from software. In one embodiment, the process of FIG. 6C is performed by hardware without being performed by software.

FIG. 6D is a flow chart describing one embodiment of a process for writing data that is not marked for a transaction write operation.

FIG. 7 is a timing diagram that describes the effect of reducing the resolution of a time stamp.

DETAILED DESCRIPTION

A transaction is a collection of read and write operations that should behave atomically. By atomically, it is meant that the operations are indivisible, so that all of the read and write operations of the transaction appear to be performed in zero time. With a software application, a programmer can identify a set of write and read operations that are part of the same transaction. A programmer can also identify a set of write and read operations that are not part of the same transaction.

The transactional memory system described herein stores a set of timestamps that each correspond to a region of memory. The corresponding time stamp is updated when any memory location in the time stamp's associated region of memory is updated.

For each memory transaction, the time at which the transaction begins is recorded. Write operations that are part of a transaction are performed by writing the data to temporary memory. Write operations that are not part of the transaction include updating the corresponding timestamp. When a transaction is to be committed, the hardware automatically determines whether the transaction has succeeded by determining whether the timestamps associated with data read for the transaction are all prior to the start time for the transaction. In this manner, the software need not check the data for all other processes or otherwise manage collision of data with respect to different processes. The software need only identify which reads and writes are part of a transaction.

Figure 1:
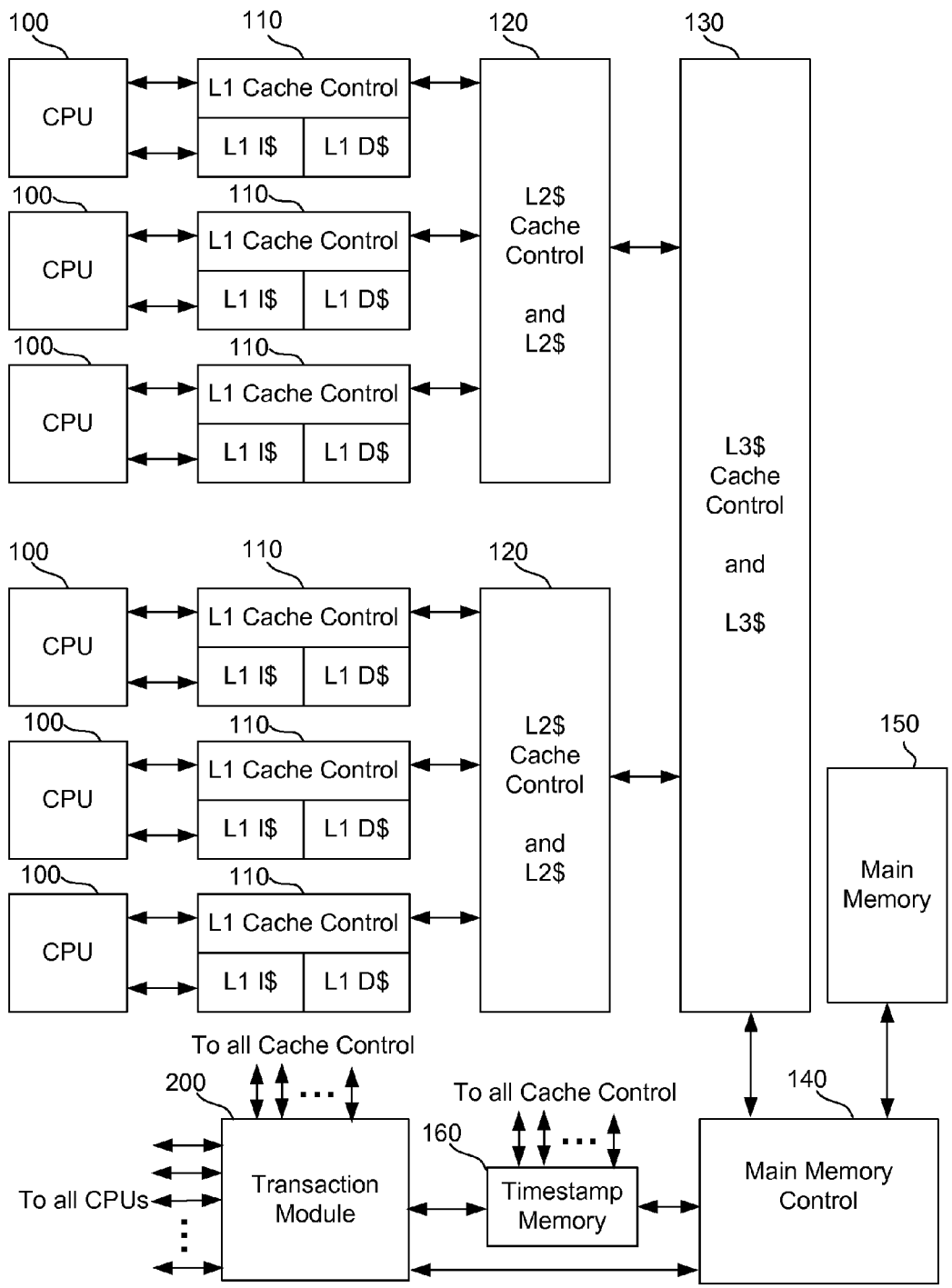
FIG. 1 is a block diagram of one embodiment of a computing system that includes timestamp based transactional memory.

FIG. 1 is a block diagram describing one embodiment of a computing system that uses transactional memory. The computing system includes multiple CPUs 100. Although FIG. 1 shows six CPUs 100, other embodiments can include more or less than six CPUs. No particular number of CPUs is required. Each CPU is in communication with a level 1 cache 110. Each level 1 cache 110 includes a level 1 cache control circuit (L1 Cache Control), a level 1 instruction cache (L1 I$), and a level 1 data cache (L1 D$). Different cache configurations cal also be used.

Multiple level 1 caches are connected to a level 2 cache 120. FIG. 1 shows two level 2 caches 120; however, more or less than two can be used. In one example, three level 1 caches 110 are in communication with a single level 2 cache 120; however, more or less than three level 1 caches can be in communication with a particular level 2 cache. Multiple level 2 caches 120 are in communication with a level 3 cache 130. Each level 2 cache 120 will include a level 2 cache control circuit. The level 3 cache includes a cache control circuit. Many different types of cache technologies can be used to implement the cache system depicted in FIG. 1.

Main memory control circuit 140 is in communication with level 3 cache 130 and main memory 150. Main memory 150 is any type of RAM suitable for a computing system. No particular memory technology is required. In one embodiment, main memory 150 is implemented as an electrical circuit according to any suitable technology known in the art. Main memory control circuit 140 is in communication with a transaction module circuit 200. Transactional module circuit 200 is in communication with all of the CPUs 100. Transaction module circuit 200 is also in communication with all of the cache control circuits, including L1 Cache Control circuits 110, L2$ Cache Control circuits 120 and L3$ Cache Control circuit 130. The computing system of FIG. 1 also includes timestamp memory 160, which is in communication with main memory control 140 and transaction module 200. Timestamp memory 160 is also in communication with all of the cache control circuits, including L1 Cache Control circuits 110, L2$ Cache Control circuits 120 and L3$ Cache Control circuit 130. In one embodiment, timestamp memory is an electrical circuit implementing RAM according to any suitable technology known in the art. Transaction module circuit 200 processes and manages the memory transactions described herein. More detail of transaction module circuit 200 will be provided below.

Figure 2:
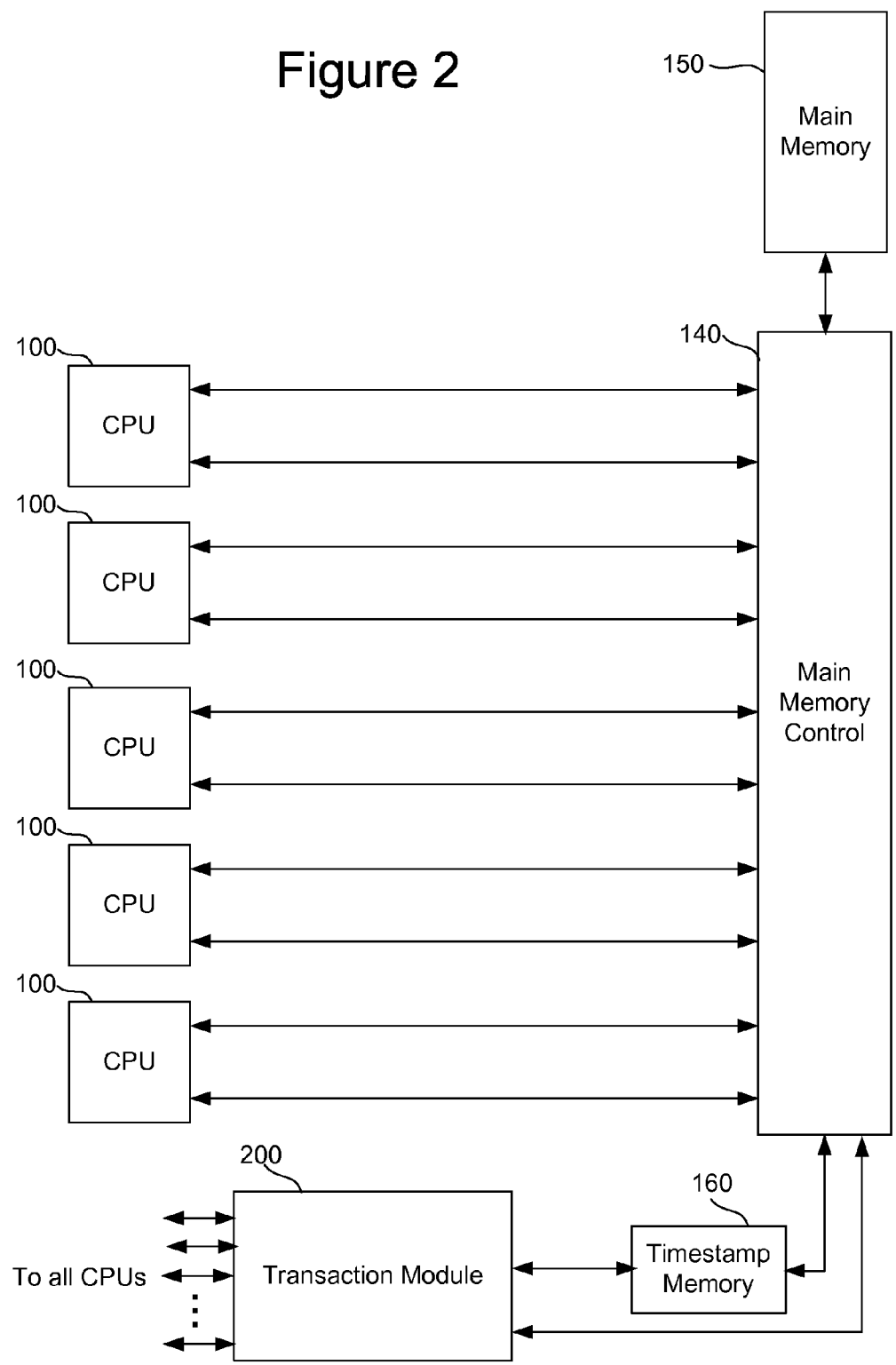
FIG. 2 is a block diagram of one embodiment of a computing system that includes timestamp based transactional memory.

FIG. 2 is a block diagram of another embodiment of a computing system that uses transactional memory. The computing system includes multiple CPUs 100. Although five CPUs are depicted in FIG. 2, the computing system can include more or less than five CPUs. The computing system of FIG. 2 does not include a cache system. Thus, the CPUs 100 are connected to main memory control circuit 140. Main memory control circuit 140 is in communication with main memory 150, timestamp memory 160, and transaction module circuit 200. Additionally, transaction module circuit 200 is in communication with timestamp memory 160 and all of the CPUs 100.

In some embodiments of the computing systems of FIGS. 1 and 2, all or portions of the functions performed by transaction module circuit 200 can be implemented in software in each of the CPUs 100 to thereby eliminate all or a portion of transaction module circuit 200. Additionally, some systems can include multiple timestamp memories 160. Other architectures for other computing systems can also be used.

Each of the computing systems of FIGS. 1 and 2 include multiple CPUs accessing main memory 150. It is possible that the CPUs will be performing tasks concurrently using different data or using an overlap of data. Thus, it is important to maintain data integrity. The solution described herein to maintain that data integrity is to use transaction memory. The software running on each CPU will identify certain sets of transactional write operations and transactional read operations that are grouped together as a transaction. However, the software will not take steps to investigate what other processes or other CPUs are doing in order to verify data integrity. Rather, the committing of transactions and verifying of data integrity will be performed by the hardware depicted in FIGS. 1 and 2, according to the processes described herein. In one embodiment, transaction module circuit 200 performs and/or directs the transaction processing. This includes performing transactional reads, performing transactional writes and committing transactions, all as described herein.

FIG. 3 is a block diagram describing one embodiment of transaction module circuit 200. Other hardware architectures can also be implemented for transaction module circuit 200.

The transaction module circuit 200 of FIG. 3 includes a CPU input processing circuit 202 in communication with and receiving data from all of the CPUs 100. CPU input processing circuit 202 is in communication with transaction control circuit 204 and provides the following signals to transaction control circuit 204: Xact Start Trigger, Xact Succeed Point, Xact Fail Point, Xact ID, Xact Read Trigger, Xact Read Address, Xact Write Trigger, Xact Write Address, and Xact Write Data. The signal Xact Start Trigger provides a trigger to indicate that a transaction is starting. In response to that trigger, transaction control circuit 204 will store a start time in Start Time Register 206 based on the system time. The signal Xact Succeed Point provides an address for directing program control if the transaction is committed successfully. That address is stored in the Succeed Point Register 208. The signal Xact Fail Point provides an address to direct program control if the transaction fails. That address is stored in Fail Point Register 210. The signal Xact ID provides an identification number for the transaction, which is referred to as the transaction ID. That transaction ID is stored in Transaction ID Register 212. The signal Xact Read Trigger indicates to transaction control circuit 204 that a transactional read instruction is being performed. The signal Xact Read Address provides an address for the transactional read that was triggered. The Read Address for the transactional read is stored in a read list in transactional read address data structure 214, which can be RAM or a set of registers. The signal Xact Write Trigger provides a trigger that the current instruction is a transactional write. The signal Xact Write Address is the address of the transactional write that has been triggered. Transaction control circuit 204 will store the Xact Write Address in a write list within Transaction Write Addresses and Write Data structure 216, which can be a RAM or other memory device. The signal Xact Write Data provides the data that is being written as part of transactional write. Transaction control circuit 204 will store that data in the Transaction Write Addresses and Write Data store 216.

FIG. 3 also depicts transaction security circuit 218, which prevents unauthorized processes or unauthorized CPUs from accessing a transaction. Transaction security circuit 218 is in communication with state table 219. More details of transaction security circuit 218 will be provided below. Interface circuit 220 provides an interface between transaction control circuit 204 and timestamp memory 160. Note that any of data stores 206, 208, 210, 212, 214, 216 and 219 can be implemented as one or more memory circuits, a part of a cache system, or part of main memory 150.

In response to transactional write commands and transactional read commands in software, transaction module circuit 200 of FIG. 3 will commence transactions, perform transactional writes and perform transactional reads. The software application need not program the details of a transactional write or a transactional read. Transaction module circuit 200 will also perform the committing of transaction. The software application need not provide the details for committing a transaction. To illustrate this point, FIG. 4 provides a flow chart describing the process a programmer would use to create an application. FIG. 5 is a flow chart describing one example of a process for executing such an application.

In step 302 of FIG. 4, a software developer creates source code for the logic of the application. In step 304, a subset of the read operations in the source code are marked as transactional reads. Only a subset of read operations are marked as transaction reads because some read operations need not be part of a transaction. In step 306, a subset of the write operations in the source code will be marked as transactional write operations. In step 308, transactions are identified. That is, a set of transactional writes and set of transactional reads can be identified as being in the same transaction. Thus, all fail or succeed together as a unit. In step 310, success actions are identified for the transactions. In step 312, failure actions are identified for the transactions. In one embodiment, identifying success actions and failure actions can include providing an address to jump to if the transaction is successful and an address to jump to if the transaction fails. The target of the addresses will include a set of steps to perform upon success or failure. Part of step 308 may include an instruction to commit the transaction and an indication of the start of a transaction. Note that, in one embodiment, the programmer does not include any notion of timestamps in the source code.

One method for identifying the transactional reads and transactional writes which are part of a transaction is to identify the start of the transaction and the end of the transaction. Then, all transactional reads and transactional writes which occur between the start and end of the transaction are considered to be part of the transaction. There are several options for identifying transactional reads, transactional writes, the start of a transaction, and the point of committing a transaction. One example includes subroutine calls. Thus, any subroutine will be considered a transaction and all of the read and write operations within that subroutine can be transactional reads and transactional writes. At the end of the subroutine, the transaction will be committed. Other embodiments include using MMIO access, a co-processor interface, special instructions (may require ISA changes), and/or access to special address ranges to identify the start of a transaction, the end of a transaction, a transactional read or a transactional write. Any of these methods may be used to generate the signals and triggers generated by CPU Input Processing 202. The particular method which is most optimal will depend on the specifics of the implementation.

Below is pseudo-code which describes source code that makes use of transactional memory:

```
// This pseudo code is located within the application and
// defines the memory transaction
transaction_id = start_transaction(failure_address,
success_address)
do some mix of:
    transactional writes to temporary memory
    transactional reads of memory (temporary or "real")
    regular writes to "real" memory
    regular reads of "real" memory
commit_result = commit (transaction_id)
if(commit_result == success)
    goto success_address
else
    goto failure_address
```

FIG. 5 is a flow chart describing one embodiment of a method for performing the source code created using the process of FIG. 4. The process of FIG. 5 is performed using the hardware of FIG. 1 or the hardware of FIG. 2. Transaction module circuit 200 is the engine that manages the processing of transactions. The process of FIG. 5 commences at the start of a transaction (step 346). For each of the memory access in a transaction, the system can perform transactional read operations, transactional write operations, regular reads and regular writes. In step 350, transactional read operations are performed. In step 352, transactional write operations are performed. In step 354, regular reads (reads that are not transactional reads) are performed. In step 356, regular write operations (write operations that are not transactional writes) are performed. Note that steps 350-356 can be performed in any order (including concurrently), and are performed in response to the source code created in FIG. 4. The various reads and writes do not necessarily happen sequentially. They can be mixed up over time and any of the accesses can occur again until the transaction is committed. In step 358, other logic of the application is also performed. The processes performed in other logic can be performed before, after or during any of the other steps of FIG. 5. In step 360, the transaction is committed. For example, the source code can include an instruction to commit the transaction, its subroutine could end, a MMIO access can be completed, etc. Transaction module circuit 200 performs the committing of the transaction. In step 362, a success action is performed if the transaction was committed successfully. In one example, program flow is routed to a success address. In step 362, a failure action is performed if the transaction was not committed successfully. For example, program flow can continue to an address identified as a failure address. In one embodiment, the source code would include logic that causes a transaction to be repeated if it failed. If the transaction fails more than a predefined number of times, then the transaction will no longer be attempted. Other types of logic can also be used.

FIGS. 6A-E are flow charts describing the process performed by the hardware described above. In one embodiment, all or a portion of the steps are performed by or at the direction of transaction module circuit 200. In some embodiments, all or a portion of the processes can be performed by any or all of the CPUs, the software running on the CPUs, cache control logic, main memory control logic, or other hardware in the computing system.

FIG. 6A is a flow chart describing one embodiment of a process for starting a transaction. The process of 6A is performed by hardware in response to software. In step 402, the hardware will obtain and store a transaction ID. In one embodiment, the software provides the transaction ID to the hardware. That transaction ID will be transmitted from a CPU 100 to the CPU input processing circuit 202, and then to transaction control circuit 200. In another embodiment, the relevant CPU can obtain its own transaction ID. In step 404, the start time for the transaction is set by transaction control circuit 204 based on the current system time in response to a trigger. In step 406, the success address is stored in success point 208. In step 408, the failure address is received and stored in failure point register 210.

FIG. 6B is a flow chart describing one embodiment of a process for performing a transactional write operation. In one implementation, the process of FIG. 6B is performed by hardware in response to the software. In step 430, a request is received by the hardware to perform a transactional write operation. For example, an instruction can be provided to perform a transactional write within the software, or a write address could have a special flag in it to indicate that it is a transactional write. In step 432, the transaction control circuit 204 first determines whether that received write address is already stored in the write list that is stored in data store 216. If not, the new write address and the data accompanying that write address are stored within Transaction Write Addresses and Write Data 216 for the transaction in step 434. If the memory address for the new write was already in the write list, then the new data is used to override the data associated with that transaction write address. The process FIG. 6B is performed for all transactional writes within a transaction.

FIG. 6C is a flow chart describing one embodiment of a process for performing a transactional read. In one implementation, the process of FIG. 6 is performed by the hardware in response to the software. In step 450, a request to perform a transactional read is received. The software can have an instruction that requests a transaction read, a read address can include a flag that indicates that the read operation is a transactional read, or other means can be used. In step 452, it determined whether the address for the transactional read is in the write list stored in Transaction Write Addresses and Write Data 216. If not, then the addressed data is read from memory and reported (i.e. returned to the CPU in response to the read) in step 454. If the address in the read request is already stored in the write list of Transaction Write Addresses and Write Data 216 (meaning that it has been the subject of a transactional write), then the data is obtained from the write list of data store 216 and reported in step 456. The process of FIG. 6C is performed for every transactional read within a transaction.

FIG. 6D is a flow chart describing a process for performing a non-transactional write. In step 480, a request is received to perform the non-transactional write operation. In step 482, the data is written to main memory (or a cache, as appropriate). In step 484, the timestamp associated with the data is updated to reflect the current system time. In one embodiment, transaction control circuit 204 (via Interface 220) is used to overwrite the timestamps in timestamp memory 160.

The technology described herein relies on a set of timestamps which have a one to one correspondence with regions of memory which can be the target of a transactional read. The timestamp is updated when any memory in its associated region is updated. Furthermore, for each memory transaction the time at which the transaction begins is recorded (as described above). Determining whether the data value stored in a memory location read during a transaction has changed can be done by comparing the time at which the transaction started with the timestamps associated with the portions of memory read by that transaction. Towards this end, the process of writing non-transactional data to memory requires updating of the appropriate timestamp. On the other hand, writing transactional data includes storing the transactional data in the temporary memory (e.g., data store 216) without creating or updating a timestamp. If the transaction can be committed successfully, then the transactional write data will be written to main memory and the timestamp for that data will be updated accordingly.

Figure 6E:
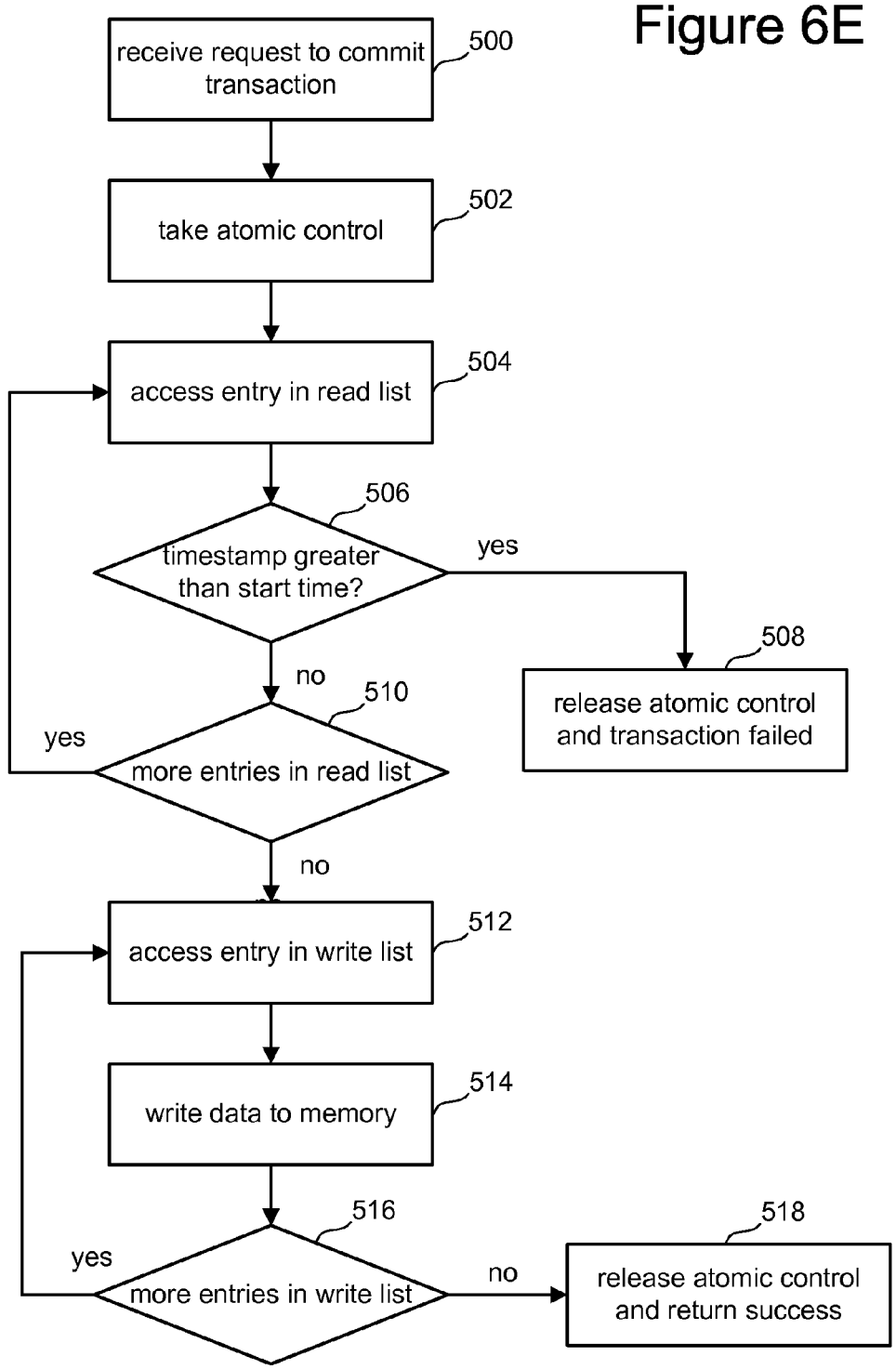
FIG. 6E is a flow chart describing one embodiment of a process for committing a transaction. In one embodiment, the process of FIG. 6E is performed by hardware without being performed by software.

FIG. 6E provides a flow chart describing one embodiment of a process for committing a transaction. In one embodiment, the process of FIG. 6E is performed by hardware (e.g., transaction module circuit 200) in response to software. Note that although many of the processes described herein are performed by hardware, alternative embodiments can include implementing all or a portion of these processes in software. In step 500 of FIG. 6E, a request to commit a transaction is received. This request can be from the software in the form of an instruction, end of a subroutine or other means. In step 502, the hardware will take atomic control of the computing system. A transaction is a collection of read operations and write operations that should behave atomically (or have the illusion that they are atomic). By the phrase "atomic" it is meant that the collection of read operations and write operations are indivisible so that all the read operations and write operations of a transaction appear to happen at the same instant of time. Thus, by taking atomic control in step 502, transaction module circuit 200 guarantees that other events will not be performed in the computing system such that it appears that the read operations and write operations are not performed at the same instant of time.

When a commit operation is performed, the following steps should appear to be done atomically: checking all the timestamps against the start time for all addresses in the read list of read addresses of data store 214 and, if the commit succeeds, copying the transactional write data to main memory (or an appropriate cache). If these steps are not done atomically, an update to one of the timestamps could occur after it is checked but before the transactional write data is written from the temporary data store 216 to main memory.

The simplest atomicity scheme to implement this is to have a system-wide token which, once obtained, stops all accesses to memory. Each commit would then obtain the token, complete the commit, and then release the token. This should be implemented in hardware to maximize the performance. Software implementations are also possible. There are several known methods for implementing a token. However, stopping all memory traffic could degrade performance. There are several optimizations that can be used to reduce the performance loss.

One optimization applies only to the state of the commit where the timestamps are checked. To achieve the appearance of atomicity while the timestamps are being checked, it is only necessary to prevent writes to memory while the commit is in progress. For example, suppose a transactional read operation for a second transaction was allowed to continue and the location read was then updated during the course of committing the first transaction. As the first commit completed, the timestamp would be updated. Subsequently, when the second transaction was committed, the timestamp check would fail. This means reads can continue during the timestamp checks for a commit.

In another embodiment, two memory address ranges are maintained during a memory transaction: lowest and highest address referenced by any transactional read; and lowest and highest address referenced by any transaction write. These ranges can be used to allow access to proceed during a commit. The following table shows the possibilities:

| phase of commit | transactional access type | outside read addr range | outside write addr range | can access proceed? |
| --- | --- | --- | --- | --- |
| checking timestamps | read | — | — | yes |
| | write | yes | — | yes |
| | | no | — | no |
| committing writes | read | — | yes | yes |
| | | — | no | no |
| | write | — | yes | yes |
| | | — | no | no |

Another embodiment includes distributing token ownership control across the system. Suppose the system is divided into several domains. Examples of domains include (1) a CPU and its level 1 cache, (2) a cluster of CPUs and their shared level 2 cache, and/or (3) a level 2 cache. Other domains can also be used. Suppose the token merely stops transfers between domains. Once these transfers are stopped, the timestamp checking for each domain can be started at different times and proceed atomically only within that domain. At the end of the timestamp check, all domains must return a result and then wait to see if the transactional writes should be committed. Note that such a scheme must allow for all transfers which have begun to finish or to be aborted.

Looking back at FIG. 6E, after taking atomic control in step 502, Transaction Module 200 will access one of the entries in the read list (data store 214). If this is the first time that step 504 is being performed, then the first entry in the read list is accessed. In step 506, the system determines whether the timestamp for that particular address is greater than the start time for the transaction. If so, then atomic control is released and the transaction has failed (step 508). If the timestamp is not greater than the start time, then it is assumed that the read data has not been updated since the start of the transaction. In step 510, it is determined whether there are any more entries in the read list to consider. If so, the process loops back to step 504 and considers the next entry in the read list of data store 214. If any of the read addresses in the read list are associated with a timestamp that is later than the transaction start time, then the transaction fails (step 508). If all of the timestamps for all of the addresses in the read list are prior to the start time, then the transaction will succeed and the process of FIG. 6E proceeds to step 512. In step 512, transaction control circuit 204 will access the first entry in the write list (data store 216). The data for that entry will be written to main memory and removed from the write list (step 514). In alternative embodiments, the data can be written to a cache. If there are more entries in the write list to consider (step 516), then the process loops back to step 512 to write the next data to main memory. When all the write data has been written to main memory (or a cache), then transaction module circuit 200 will release atomic control and report that a successful transaction being completed.

FIGS. 1 and 2 show a single timestamp memory 160, which can comprise one or multiple memory circuits. In another embodiment, the single timestamp memory 160 can be replaced by and augmented with a distributed system for storing time stamps. One example implementation stores timestamps throughout the caches.

There are several opportunities to optimize the checking of timestamps. First, the read list can be read to obtain the addresses referenced by transactional reads. The cache coherency mechanism can be reused to locate those memory locations in the system to obtain the associated timestamps. Each timestamp can then be checked against the start time. If any of the timestamps is more recent than the transaction start time, then the timestamp checking can be stopped immediately and the memory transaction can be aborted.

It is not necessary to return the timestamp to a central checking point. Instead the start time and addresses can be broadcast followed by a signal indicating all addresses have been transmitted. Then, the timestamp checks can be performed locally and only the final results need to be collected.

Alternatively, cache replacement algorithms can be altered to optimize timestamp checking. The timestamp associated with the target of a transactional read will be located more quickly if it is in the lowest level of cache. This will be more likely if such target cache lines are identified and their retention is favored when a cache line must be cast out.

If a transaction is to be aborted, then any resources owned by the memory transaction should be released. Therefore, the write list and read list can be used to identify all the dedicated buffers, associated buffers and transactional cache lines which store write data. Each such resource should be released (e.g., invalidating transactional cache lines). Also, any flags associated with resources which are not released should be cleared.

If the timestamp checking passes, then all the transactional write data should be committed by copying the transactional write data from data store 216 to memory. The write list helps optimize this process by identifying all locations which must be copied. If a write target is not located close to data store 216, then the write address can be broadcast and the data can be broadcast throughout the system so that the write operation can be completed at the locations which currently own the data.

Sometimes it can be determined that a memory transaction will ultimately fail before the commit is actually attempted by the application. In such cases, performance improves if the memory transaction is aborted as quickly as possible. To prematurely abort using hardware support, the flow of execution in the application can be transferred to the failure address. This can be done with an interrupt. It is also possible to build a mechanism into the CPU so that control is immediately transferred to the failed address without the need for an interrupt. If prematurely aborting is not done by any of these optimizations, a flag can be sent indicating that the transaction has failed. This flag can be checked by software which can then transfer control to the failure handling. Alternatively, this allows the commit to skip the timestamp checking and immediately jump to handling the failure.

There are multiple ways to prematurely identify that a transaction can be aborted. For example, if a transactional read operation sees a timestamp which is later than the start time of the transaction, then that transaction can be aborted.

In another embodiment, a hardware engine can scroll through the read list in data store 214 checking timestamps against transaction start times using background bandwidth. If a comparison fails, the transaction can immediately be aborted. This can be combined with eliminating duplicate entries from the read list of data store 214.

Keeping a timestamp at full spatial resolution (one timestamp per memory location) and full temporal resolution (single clock accuracy), is expensive. That is, the cost of timestamp memory 160 will be high if there is one timestamp for every single memory location in main memory 150. The memory required for the timestamps can be reduced by keeping a single timestamp for N bytes of memory. In the simple main memory only system, N can be any size. Then, the number of timestamps which must be maintained is reduced by a factor of N. Note that the write list of data store 216 still stores the full address so that the appropriate data may be written during commit. The reduced resolution time stamps which cover N bytes of memory are only used for comparison purposes to see whether a transaction has succeeded.

If an infinitely large timestamp can be stored, then the timestamp comparison will always be valid. However, this is not cost effective. So, periodically, the current time which can be stored in a timestamp will wrap back to zero. This period of time is determined by the number of bits dedicated to each timestamp. When this occurs, one embodiment includes setting all timestamps to zero and invalidating all memory transactions which are currently taking place. Doing this will insure that the comparison between the time when a time transaction starts and the timestamps associated with the main memory return the correct results. This approach also addresses a failure mode. It is possible for an application to start a memory transaction and never terminate. If the transaction is terminated when the wrap occurs, all transactions will eventually be completed.

Note that there are several drawbacks to resetting all timestamps simultaneously. For example, the system performance dips while the memory is tied up for timestamp updates. Additionally, power consumption may spike during the timestamp reset. Since the timestamp is periodically reset, there is some limit on the time that a memory transaction can take. If the memory transaction exceeds that limit, then force failure the transaction.

Figure 9A:
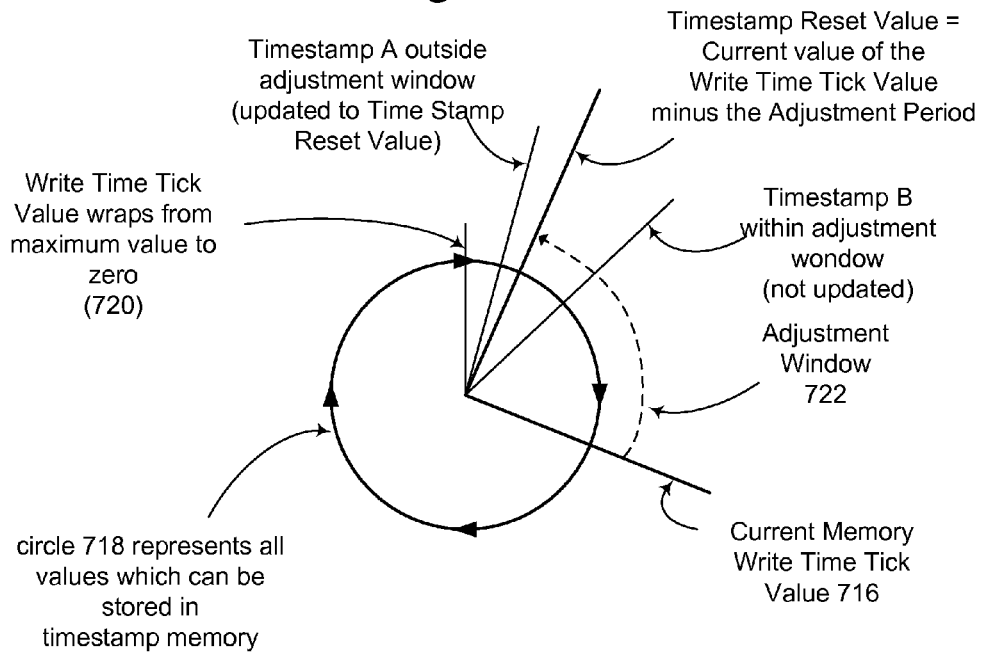
FIG. 9A is a chart that explain the automated adjusting of time stamps.
Figure 9B:
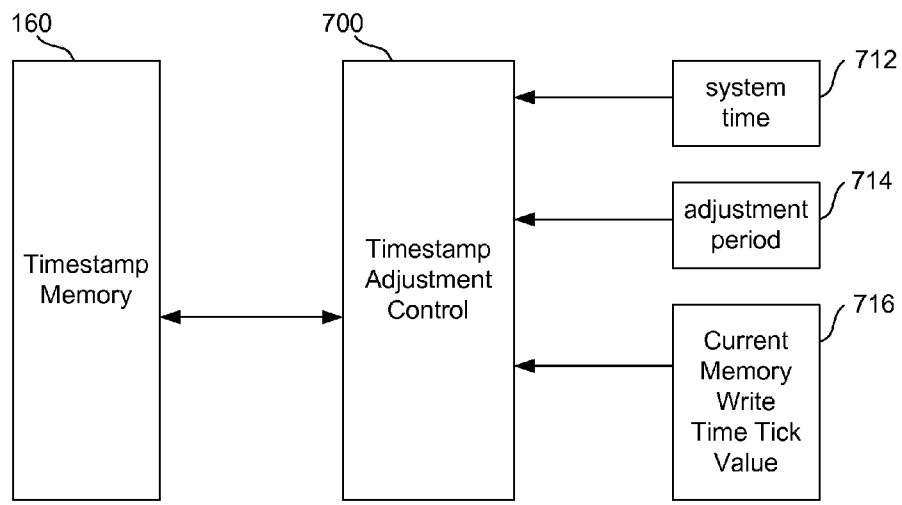
FIG. 9B is a block diagram of one embodiment of components used to automatically adjust timestamps.
Figure 10:
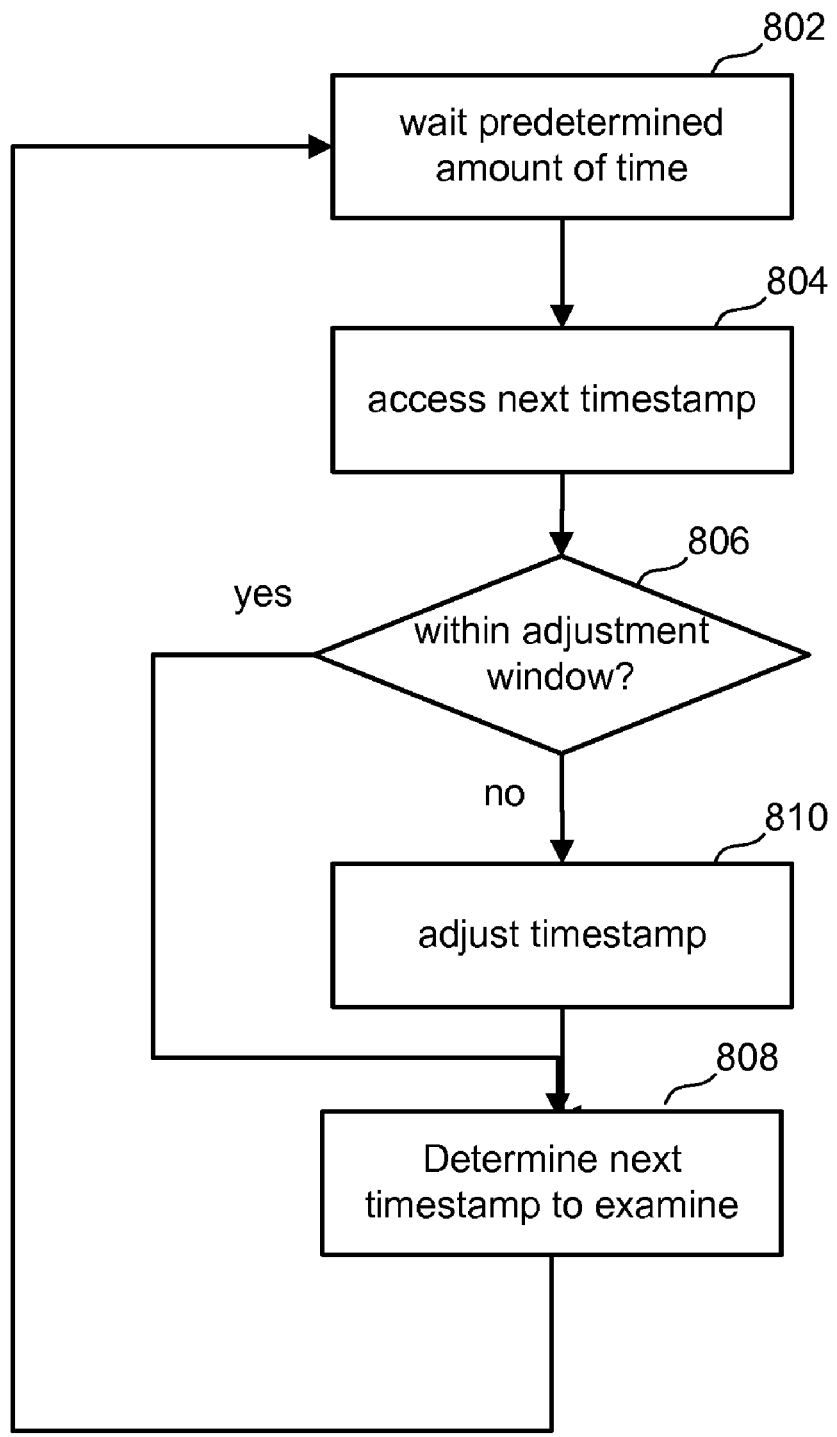
FIG. 10 is a flow chart describing one embodiment of a process for adjusting timestamps.

FIGS. 9A, 9B and 10 provide another mechanism for dealing with a timestamp that can wrap back to zero. FIG. 9A graphically depicts the wrap around problem. A circle 718 is drawn to show that the timestamp wraps from the maximum value to zero (see point 720 on circle 718). The circle 718 represents all the values which can be stored in timestamp memory. An adjustment window 722 is created. This adjustment window is some finite amount of time less than the full circle. The requirement is then made that all transactions must complete within the time period which corresponds to the adjustment window. If a start time for a transaction is different from the current Memory Time Tick Value 716 by more than the adjustment window, then that transaction is automatically failed. Suppose a timestamp A is older than the current time failed. Then, any transaction which could succeed would have a start time which was after timestamp A and after the current time minus the adjustment window. Therefore, if a timestamp A is older than the adjustment window and the transaction start time is older than the adjustment window, then the transaction fails automatically so that the value of the start time can be changed without creating an improper result. Therefore, if the timestamp A is older than the adjustment window but the start time is within the adjustment window, then the timestamp A can be changed to the timestamp reset value at associated with the edge of the adjustment window without causing a problem because it will still be behind the start time. The timestamp reset value is equal to the current Memory Time Tick Value 716 minus the adjustment period, where the adjustment defines the adjustment window 722. Thus, the wrap around problem can be avoided by checking for any timestamps that are behind the adjustment window. Any timestamps (e.g. timestamp A) that are behind the adjustment window will be updated to the edge of the adjustment window. The adjustment sets the timestamp to be equal to the Timestamp Reset Value, which is the current Memory Time Tick Value 716 minus the Adjustment Period that defines the Adjustment Window. Timestamps within the adjustment window (e.g. timestamp B) will not be updated. This will prevent the timestamps from being affected by the wrap around process. Note that the timestamps for all of memory must be examined in the period which is the full circle minus the adjustment window. Thus, a larger adjustment window places more restrictions on the timestamp update activity.

FIG. 9B shows a timestamp adjustment control circuit 700 in communication with timestamp memory 160. Timestamp adjustment control circuit 700 receives system time 712, an adjustment period stored in the register 714 and a current memory write time tick value 716 (which can be stored on a bus in a register, etc.). The adjustment period specifies the width of the adjustment window 722. In one embodiment, timestamp adjustment control circuit 700 will adjust the timestamps in timestamp memory 160 to avoid the wrap around problems discussed herein.

FIG. 10 is a flow chart describing the process performed by timestamp adjustment control circuit 700 (in relation to FIG. 9). In step 802, timestamp adjustment control circuit 700 will wait a predetermined amount of time. In this embodiment the timestamp adjustment control circuit 700 walks through memory at an even pace so that each memory location is visited within the wrap time minus the adjustment time. The predetermined time is then:

(wrap_time−adjustment_time)/total_number_of memory_locations_adjusted.

In step 804, timestamp adjustment control circuit 700 will access a timestamp in timestamp memory 160. If this is the first time that step 804 is being performed, then the first timestamp in memory 160 will be accessed. In step 806, the value of the timestamp is compared against the Current Memory Write Time Tick 716. If the timestamp currently being accessed is within the adjustment window of the Current Memory Write Time Tick Value, then no adjustment is made and the process continues at step 808. In step 808, timestamp adjustment control circuit 700 determines whether there are more timestamps the next timestamp to consider in timestamp memory 160. If not, the process is done, The process then loops back to step 802 and waits for the next iteration. This process occurs continuously as long as the system is operating. If there are more timestamps to consider, then the process loops back to step 804 and considers the next timestamp. If in step 806 it is determined that the current timestamp being accessed is outside the adjustment window (behind the Current Value Write Time Tick Value by more than the adjustment period), then the timestamp is adjusted to be the Timestamp Reset Value (which is at the edge of the adjustment window) which is at the edge of the adjustment window. After step 810, the process moves back to step 808 to determine whether there are more timestamps to consider.

The memory required for the timestamp can further be reduced by lowering the temporal accuracy of the timestamp. For example, suppose the fastest clock associated with the memory is 4 GHz and the timestamps are reset every 16.78 ms or the wrap time for the timestamp is 16.78 ms. Then, a timestamp with a full 4 GHz clock accuracy would need to be 26 bits wide. However, if the collision between memory transactions are sparse, keeping a timestamp with this accuracy will not increase system performance. If, for example, a timestamp with 256 ns accuracy is used, then only 16 bits are required for the timestamp. The optimal tradeoff between accuracy of the timestamp and storage required would depend on the system and the implementation of the timestamp. Decreasing the maximum timestamp value decreases the memory overhead of the timestamp. Increasing the maximum timestamp value increases the period in which the entire memory must be trolled to update the timestamps, thereby decreasing the overhead of the trolling. It is also possible to use a different spatial resolution for the timestamp for the different areas of memory.

FIG. 7 is a timing diagram which shows that a reduced accuracy timestamp does not cause errors. The drawing of FIG. 7 includes five lines of data including a Full Accuracy Time Tick Value, Reduced Accuracy Time Tick Value, Transaction Start Time Tick Value, Memory Write Time Tick Value, and Alternate Memory Write Time Tick Value. The Full Accuracy Time Tick Value represents a full accuracy timer. The Reduced Accuracy Time Tick Value indicates what the timer would read if it used the reduced accuracy being proposed. The Transaction Start Time is set to the Reduced Accuracy Time Tick Value. The Alternative Memory Write Time Tick Value indicates the time that would be stored as the timestamp when a write operation is performed. As can be seen, the Alternative Memory Write Time Tick Value lags the transaction start time by one clock cycle; therefore, insuring that a timestamp comparison to a transaction start time will provide the correct results.

Figure 8:
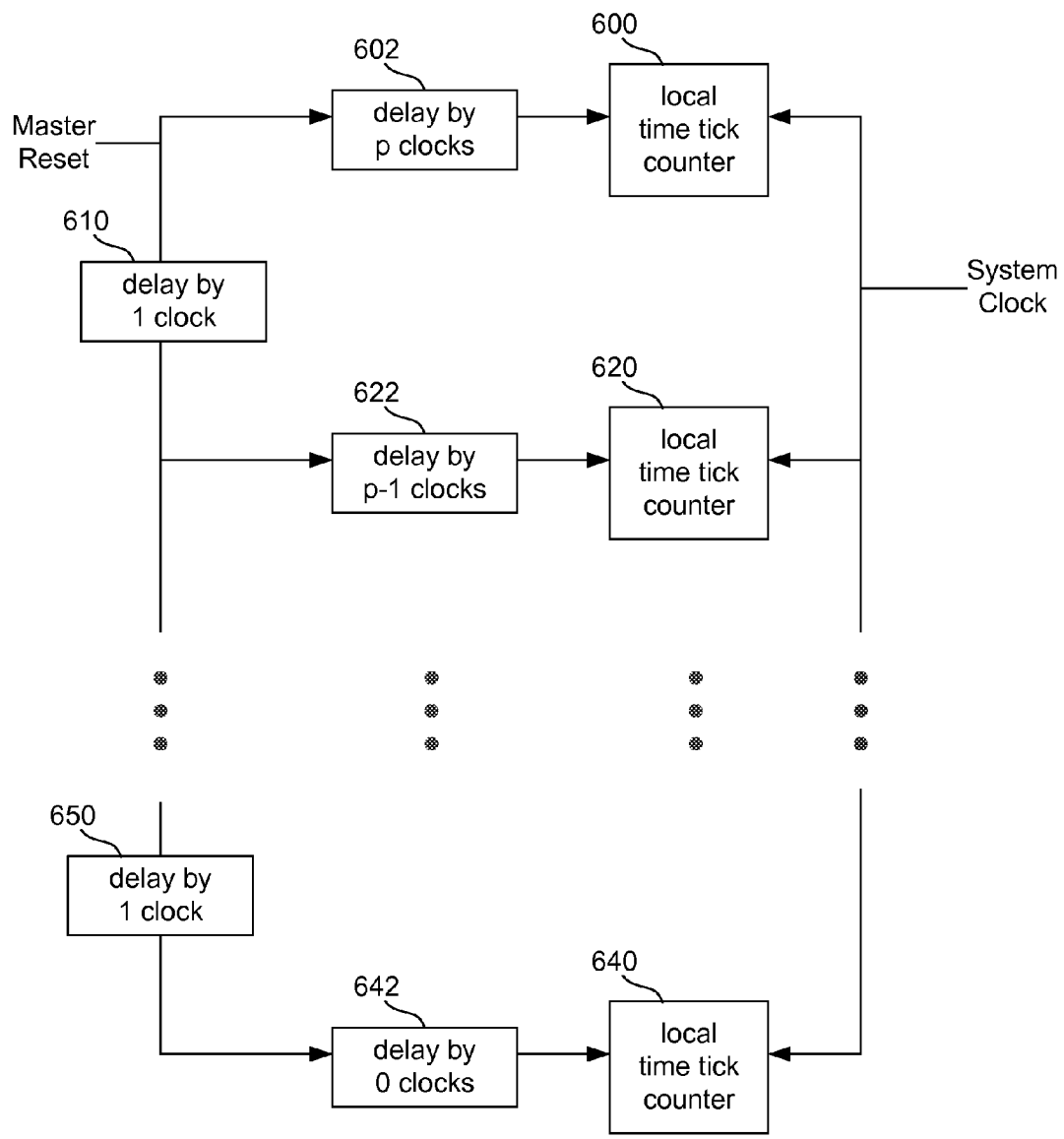
FIG. 8 is a block diagram that describes how to distribute a reset signal for distributed counters that create timestamps.

FIG. 8 provides a scheme for insuring that all clocks will receive a master reset in synchronization so that local clocks are then synchronized to insure that they all compute timestamps correctly. Each of the Counter 600, 620, . . . 640 are used to compute the current timestamp. The system clock is used to increment the counters. FIG. 8 provides a block diagram for providing the system clock to the different counters and for distributing the master clock to the counters without using a bus. A Master Reset signal is sent to multiple paths. The first path is received directly from the Master Reset and delays the reset by p clocks (delay 602) before sending the Master Reset to local time tick counter 600. The second path receives the Master Reset delayed by one clock (delay 610), and then delays that signal by p-1 clocks (delay 622) before sending the signal to counter 620. For each additional path, there is another one clock delay until the final path (see a Delay 650). The final path has a zero delay (delay 642) before sending the signal to its local counter 640. All the counters receive the system clock for timing purposes.

Keeping a timestamp for a small portion of memory can be expensive. However, keeping a single timestamp for a large portion of memory may reduce performance. For example, suppose a timestamp is kept for 128 B of memory. Suppose that a series of data structures are stored so that within one 128 B block so that one data structure ends and the other begins within the block, and that two memory transactions access these two data structures. Although there is no conflict between the two memory transactions, the use of a single timestamp for the full 128 B may cause a transaction to fail. There are various alternative timestamp applications which can help reduce such performance loss.

One variation is to support two (or more) timestamps for each block of memory such that the timestamps can be dynamically configured by the transactional control circuit to correspond to any of different regions in the block. In one embodiment the following data is maintained for each block of memory.

| | |
|---|---|
| timestamp1 | The "most recent" timestamp |
| timestamp2 | The "older" timestamp |
| timestamp1_mask | A mask which indicates which part of memory is covered by timestamp1 vs timestamp2 |

In addition a parameter is maintained:

| | |
|---|---|
| timestamp_delta | A time range during which activities are assumed to be related. |

When a write occurs the timestamps are updated as follows:

```
if ((current_time - timestamp1) < timestamp_delta) {
    timestamp1 = current_time
    timestamp1_mask = timestamp1_mask |
            timestamp_mask_for_write_location
}
else {
    timestamp2 = timestamp1
    timestamp1 = current_time
    timestamp1_mask = timestamp_mask_for_write_location
}
```

Keeping only two timestamps is much less expensive than keeping a timestamp for each memory location. However, if the time at which only the last two accesses occurred were kept then multiple accesses to a data structure would negate the advantage of the two timestamps. By using a timestamp_delta to group the timestamp updates for groups of accesses closely spaced then accesses which are related will update only one timestamp.

A second variation is to attempt to group accesses to memory so that all transactional writes done for the same memory transaction commit results in only one timestamp update. Once again the following information is maintained for each block of memory:

| | |
|---|---|
| timestamp1 | The "most recent" timestamp |
| timestamp1_mask | A mask which indicates part of memory covered by timestamp1 vs timestamp2 |
| timestamp2 | The "older" timestamp |

The timestamps and mask are then updated as follows:

```
if (regular_write) {
    timestamp2 = timestamp1
      timestamp1 = current_time
      timestamp1_mask = timestamp_mask_for_write_location
}
else if (set_of_writes_for_a_commit) {
    timestamp2 = timestamp1
    timestamp1 = current_time
    timestamp1_mask =
  timestamp_mask_for_set_of_trans_writes
}
else (error)
```

The two previous approaches can also be combined by updating the data structures as follows:

```
if (regular_write) {
   if ((current_time − timestamp1) < timestamp_delta) {
      timestamp1 = current_time
      timestamp1_mask = timestamp1_mask |
timestamp_mask_for_write_location
   }
   else {
      timestamp2 = timestamp1
        timestamp1 = current_time
        timestamp1_mask = timestamp_mask_for_write_location
   }
}
else if (set_of_trans_writes) {
   timestamp2 = timestamp1
   timestamp1 = current_time
   timestamp1_mask = timestamp_mask_for_set_of_trans_writes
}
else (error)
```

In a cached system, the data may reside in any of several caches. The timestamp must be stored when a memory location is written and must be accessible when a memory transaction which has altered that memory location is committed. There are several approaches to maintaining the timestamp and allowing a commit to proceed properly which include: (1) avoid caching data which has been written, thus eliminating the need to store a timestamp within that cache; (2) use a write through policy for the cache in question (In such a cache the backing store for the cache must store the timestamp); (3) add a timestamp to the cache in question (The timestamp and data may then be propagated to backing store or the cache snooping mechanisms can indicate that the only valid copy is in the cache in question); and/or (4) use a write through policy, but also keep a local copy of the timestamp in the cache in question.

Note that the approach for each cache may differ. Regardless of the approach chosen all caches which may contain the locations in the read list should be checked during a commit. This activity may leverage existing snooping mechanisms. Some possible optimizations include sending the start_time and a sequence of addresses to be checked to each cache. Then, the cache can just supply a pass/fail result. Another optimization is to use a snoop to locate the data, but just return the timestamp (not the data) to the hardware which is doing the check for the commit. All writes which are committed must be propagated through the system so that memory remains coherent. This may require invalidating the data in some caches or other activities depending on how the cache system is designed. The atomic memory control token must cover all caches which could contain data referenced by a memory transaction to ensure atomicity.

Once there are different levels of memory (not just main memory) it becomes possible to maintain different spatial resolutions of the timestamp in different levels of cache. If most accesses hit in the caches closer to the CPU it will be worth maintaining more resolution in those caches. For example the following could be done:

L1 cache: timestamp per ½ cache line

L2 cache: timestamp per cache line

L3 cache: timestamp per 4 cache lines main mem: timestamp per page

As data migrates to a higher numbered cache the existing timestamp and the timestamp for the arriving data is compared. The most recent timestamp is kept.

It is also possible to maintain different temporal resolutions of the timestamp in different levels of cache. This may be advantageous if transactional read data is expected to reside in a particular cache (e.g. that closest to the CPU) at the conclusion of a memory transaction. The additional resolution could then reduce the chances of conflicts between different memory transactions. For example, the following temporal resolutions of the timestamp could be used:

L1 cache: every 128 system clocks

L2 cache: every 256 system clocks

L3 cache: every 512 system clocks

Finally, the maximum time period supported by a timestamp may differ between caches. For example:

L1 cache: maximum value of 100 us

L2 cache: maximum value of 400 us

L3 cache: maximum value of 800 us

In this case the periodic updating of the timestamps to deal with wrapping must be adjusted. For example, if an adjustment window is used then the timestamps must be examined in each cache in the period allotted by the maximum timestamp value minus the adjustment period.

There are multiple options for implementing the write list in data store 216. In one approach, the write list for each transaction ID is implemented with associative memory. A dedicated associative buffer holds the entries. When a transactional write occurs, the key used to reference the buffer includes the address targeted by the transactional write. If the buffer is shared between processors or processes, then a process ID field must be included in the key. It is also possible to share a buffer between transactions by including the transaction ID in the key used to look-up entries in the associative buffer. The address/data pair would be written to the buffer if not already present and overwritten if present. If the buffer filled up then a backup set of buffers in main memory could be used. When a transactional read occurred, the table below shows how the read is handled depending on the state of the write list buffer. To prevent unnecessary searching it is assumed that a flag is kept to show whether the associative buffer has overflowed.

| data in associative write buffer? | flag equals overflowed? | data in overflow write buffers? | searches performed | source of read data |
|---|---|---|---|---|
| yes | na | na | search assoc write buffer | assoc write buffer |
| no | no | na | search assoc write buffer then read memory | memory |
| no | yes | yes | search assoc write buffer then search overflow buffers | overflow buffers |
| no | yes | no | search assoc write buffer then search overflow buffers then read memory | memory |

Figure 12:
FIG. 12 is a block diagram of a multi-field address.

The list of requirements for the write buffer is similar to the requirements for a cache. This suggests an approach which reuses much of the cache support already found in many CPUs. Instead of storing transactional write data in a separate buffer it can be stored in the caches used to store data backed by main memory. The cachelines updated by a transactional write from cachelines (referred to as "transactional cachelines") must be distinguished from cachelines which are backed by main memory (referred to from this point as "real" data). To do this a trans_flag is added to the normal cache tags. In addition, an id_tag field is added to the cache tags and used to store the transaction ID. The transaction ID field distinguishes write list entries for different memory transactions. If the cache had a timestamp field this may be reused for the id_tag since there is no timestamp required for data written by a transactional write during a memory transaction. FIG. 12, for example, shows an address format used in a cache with a portion storing an address (e.g., 30 bit address), a portion storing an id_tag, and a portion storing a trans_flag. In one example, the trans_flag is set to 11 if the data is transactional and the trans_flag is set to 00 if the data is not transactional.

When a transactional write occurs the caches are checked to see if a transactional cacheline corresponding to the write address exists. If it does then the transactional cacheline is updated. If it is not then a copy of the entire cache line in "real" memory is placed in the cache and the trans_flag is set. If the "real" data is not in the cache then it will be fetched from a higher level cache or main memory, and the normal cache replacement algorithm can be used to make space. However, if the "real" data already resides in the cache and is unmodified it is possible to abscond with the resident "real" data by just changing the cache tags or to copy the "real" data to create the transactional cacheline. If the "real" data is later required, a fetch from backing store can be used to retrieve it. The normal cache replacement algorithms can be used to move transactional cache lines between cache levels.

When a transactional read occurs the address and possibly a processes identifier and/or transaction ID will be used to construct a tag for checking the contents of the cache. The access will hit first on the "transactional" copy if it exists in any level of cache and then on the data in "real" memory if it does not. Unfortunately, it is possible for the transactional cacheline to move to any location in the memory system. Thus, if a read is made then all of the caches must be searched. To improve performance it is advantageous to maintain a flag, xact_casteout, for each cpu and for each transaction and for the first level of cache. This flag would be set to zero at the start of the transaction. If a transactional cacheline associated with a particular transaction was cast out of the first level cache, then the flag associated with that transaction would be set. When a read is performed the xact_casteout flag can be used to limit the search for the read data to only the first level cache which contains the data. It's possible to extend this scheme so that an xact_casteout flag would be maintained for all caches which could be accessed by a particular processor. Note that because only one flag is kept for all transactional data performance will degrade after only one transactional cache line is caste out to a higher level of cache. To reduce this performance loss additional xact_casteout flags can be maintained and some of the address bits can be used to reference the xact_castout flags.

When the memory transaction is committed, the write data must be located so that the data can be copied to memory. It is not cost effective to search all of the caches for this data. Thus, although the write list data is copied in the caches it's advantageous to maintain a list of write list addresses in a buffer in memory. This buffer need not be associative because it will not be searched. It also does not need to contain the data as that will be obtained from the caches.

During the commit the write data must replace the system data which may be stored in any of the caches or in main memory. Existing cache snooping mechanisms may be used to locate the data targeted for replacement and to gain control of that data. Additional optimizations can be made to reduce the overhead of copying the transactional write data. One optimization is to identify the cachelines which have been the target of a transactional write operation and favor the retention of such cachelines in the cache, as well as the retention of the transactional cache line. This will increase the chances that the transactional write data can be copied without the need for a snoop or for an access to a higher level of cache. Another optimization is to merely adjust the cache tags for the original data and the transactional data. The tags for the transactional cacheline can be adjusted to indicate that it is now the actual data, while the tags for the actual data can be updated to indicate that the cacheline is now invalid.

Note that it is possible for a conflict to cause enough cache conflicts to force one of its own write list entries to be evicted from all caches. This should be a rare event so support for such an occurrence need not be high in performance. These are a couple of backup mechanisms which can be used: have an overflow buffer which is used for write list entries which would be forced to main memory and/or use a highly associative L3 cache so the limit on the number of write list is not restrictive.

One embodiment keeps write flag bits for each portion of each cacheline (e.g. a byte). In addition, the only data stored in the transactional cacheline is write data. The data from the real cacheline is not copied into the remainder of the cacheline. If there is a transactional read to that cacheline, one of three scenarios occurs:

1) It only reads those portions of the cacheline which have been written. In this case the read will not be considered to be a transactional read and the update to read list buffer is not required.
2) It reads only those portions of the cacheline which have not been written. In this case the read should receive the data from the "real" cacheline and an entry should be added to read list.
3) It reads both portions which have been written and have been read. In this case the data should be sourced from both the associative cacheline and the "real" cacheline. An entry should also be added to read list.

With this approach, transactional cacheline data which is not written must not be copied back to "real" memory when a commit succeeds. This follows because the addresses are not recorded the in read list and therefore the timestamp on that data will not be checked by the commit. With this approach it's also possible to eliminate the need to fetch a line the first time it is a target of a transactional write. Instead, only the bytes which have been written need to be valid and that data is already available because it is being written. This approach might increase performance or it may add cost and complexity without a compensating performance gain.

Another alternative is to use part of the transactional cacheline itself to store the write flags. Here are some possibilities:

Store the byte write flags in the first ⅛ of the cacheline. If this portion of the cacheline is written then create a transactional cacheline by copying the data and add an entry to the read list buffer.

Store only word flags to reduce the chances of copying the cacheline and adding to the read list buffer.

Use the first portion of the cacheline to store the offset and size of the data written and also to store the data.

If the cacheline can no longer accommodate the flags because of the data written then a copy of the cachline must be made in which all of the bytes are valid. This new transactional cacheline must be constructed by merging the "real" cacheline data with the data which was previously written and an entry must be added to read list. A separate flag in the cache tags can be used to indicate that the entire cacheline should be copied if the commit succeeds.

Once the transaction ID is created, it must be communicated to the caching hardware. It would be possible to create a special mechanism for this. For example, a context switched register which is set by the application could be used. A more flexible alternative is to have the address space identify which memory transaction is being done. This is feasible on a system with 64 bit addressing. The higher order address bits not normally stored in the cacheline tags could be stored in the ID field. Then, the address checking normally done by the cache could be enhanced to properly handle transactional cachelines.

If a transactional cachline is created for transactional reads then a transactional write which hits in that cacheline may or may not be the first transactional write to the cacheline. Thus, every write may require adding a new entry to the write list buffer. To avoid this, an additional flag for each transactional cacheline which indicates whether any portion of the cacheline has been written can be maintained. If the flag is set when a transactional write is done then no entry need be added to write list when the flag is set.

There are multiple solutions for preventing transactional data from being flushed from all caches. First, a highly associative L3 cache can be used. In this case the entire L3 cache belongs to the same congruence class. Another option includes carving out a portion of the L3 cache to act as a highly associative cache for only transactional data. This has the advantage that the cacheline size can be optimized (i.e. made smaller) resulting in better memory utilization. Another option includes implementing a separate highly associative transactional cache on the CPU. It would behave like any other cache, but would only hold transactional data and could be smaller than most caches. Therefore, the cost of increasing the associatively would be relatively low. Alternatively, a portion of main memory can be carved out to act as an additional cache with one congruence class. The cache tags for the main memory cache would be kept on the CPU. In each of these scenarios an upper limit still exists, but it is so much higher that the limit on the memory transactions becomes acceptable. By counting the number of transactional cachelines currently active the system can identify when the limit is being approached and scale back by aborting memory transactions in process or delaying the start of new memory transactions.

To conserve space in the read list some bits may be omitted from the addresses stored in read list. Note that data can migrate to any cache in the system. Therefore, the address stored should contain all of the bits used to identify the cacheline in the cache or memory which has the highest spatial resolution of timestamp.

When a commit takes place the timestamps of every address in the read list buffer must be checked. This leads to a requirement that the entries in read list be simple and straightforward to locate. Thus, a separate buffer which can be referenced when a commit takes place is advised. This buffer could be a simple buffer, a set of linked lists, a series of hash tables, etc. However, there may be performance advantages to supporting references during a memory transaction. Depending on the system tradeoffs the same associative approaches used for write list may be suitable for read list.

One drawback to using a simple buffer for read list is seen when the application performs many transactional reads to the same memory location. In the simplest approach each transactional read results in a new entry in read list, regardless of whether that location was previously the subject of a transactional read. Thus can bloat the read list buffer and increase the time to process a commit. There are several optimizations which can reduce this problem:

Advise applications to access a particular piece of data only once using a transactional read. When a second read to the same location is done do a regular read. This eliminates duplicate buffer entries and if the data has changed the memory transaction will eventually fail anyway. Unfortunately, this is awkward and likely to lead to bugs.

Troll through the xacts_rd buffer and eliminate duplicates. This can be done with a hw engine and spare bandwidth or as a background SW task. It is also possible to sort the entries in the background since their use is order independent. This may improve the efficiency of reducing duplicates.

Suppose that the following is true of the write list implementation in a system:

addresses associated with transactional writes are also considered to be transactional read addresses the transactional write addresses can be accessed associatively so such addresses are added to read list Then, when a transactional read is executed the system will search for the transactional write address first, in case the data being read was written via a transactional write. If such data is found then there is no need to add the address to read list.

In one embodiment, all transactional writes are performed by writing the temporary data to a cache so that timestamps need only be maintained for data in the cache. In one such implementation, the temporary data, the write address, the transaction ID and the timestamp can all be stored on the cache system.

In addition to these optimizations providing some associative support for read list could be cost effective. Some example of such support are:

Search the last few entries in read list when a new entry is added and eliminate duplicates. If there is a strong locality of reference then fewer entries will be added to read list.

Keep the last few addresses added to read list in a small associative buffer. Then, if successive reads are made to the same few cachelines the new read addresses would match those in the associated buffer and could be ignored.

If a cacheline is accessed with a transactional read then make a transactional copy of the cacheline. Then, if a subsequent read hits this cacheline the address does not need to be added to the read list buffer. Note that the copy is necessary because the transaction ID must be stored in the tags to distinguish transactional reads by the memory transaction from the transactional reads of another memory transaction.

The relationship between the nested (or child) transaction and the parent transaction can be tracked. During the nested transaction, a transactional read or write should first see if any of its ancestors have updated the location in question. If any of them have updated, the location the nested transaction should "read" the updated transactional data. When a child transaction is committed the correct timestamp, checks must be made to guarantee that the behavior of the child appears to be atomic to its parent. If the nested transaction fails, then the system must be able to unwind all of the transactional writes done by that nested transaction without unwinding all of the transactional writes done by ancestor transactions. In addition, any other resources tied up by the child transaction must be released. If the nested transaction succeeds then the data updated with transactional writes should be seen by the parent of the transaction, but no other transactions and no other system processes. Note that ancestors, other than the nested transactions parent, should not see the writes. In addition, any other resources tied up by the child transaction must be released.

One requirement of the proposed system is to associate a child transaction with its parent. This can be done by adding a nesting field to the transaction ID. Another extension alters the memory search algorithm so that data read by a child transaction finds any data written by its ancestors. For example, when a transactional read is done a search is performed for any block of memory which has a matching transaction ID. Such a block must have been updated by an ancestor of the current memory transaction or the current child memory transaction The block of data returned is chosen as follows:

if no block of memory has a matching transaction ID then return data from "real" memory if one block of memory has a matching transaction ID then use that block of memory if multiple blocks of memory have a matching transaction ID then use the block of memory w/the deepest nest level which is not deeper than the nest level presented by the read When a transactional write is done both the transaction ID and the nest_level are written to the cache tags associated with that block of memory. Recall that, for some implementations, the transactional write will cause some data to be considered to be the target of a transactional read. In these cases the transactional data is found and a copy is made and that copy is updated.

The next extension is an alteration to the timestamp checking. When a child does a transactional read the data may be sourced from either "real" (also called standard) memory or from a copy created for an ancestor. If the data is sourced from "real" memory then the timestamp of that memory must be checked against the child's start_time. However, if the child sourced the data from a copy created for the parent then the data could not have changed while the child transaction was taking place. This follows because once a child transaction has begun all transactional reads and transactional writes are associated with the child transaction. These cases can be distinguished by searching the appropriate read list buffer and write list buffer entries for the ancestors of the child when the commit is done. A more optimal method is to note the source of the read data as entries are created in read list and skip the timestamp check for data sourced from a copy, not "real" memory.

The next extension allows only the writes done at the current nest level to be aborted. If an ancestor is prohibited from doing transactional writes while the child transaction is active, then any data associated with the ancestors cannot have changed. So, the only requirement is that the data associated with the child transaction be discarded. As with the original scheme, data altered by a write transaction is identified by the write list buffer.

If a portion of the memory address is used to specify the transaction ID, then there may be a need for security. For example, if a process has a bug in it, then it may inadvertently make a transactional access involving a transaction ID for an unrelated memory transaction. It is also possible that a malicious process would intentionally perform such access. An additional protection mechanism can be included to prevent this.

One approach is to have an additional transaction state table 219 (see FIG. 3), which stores processor numbers and/or process numbers with transaction IDs. When a transaction is started, the processor number and/or process number are noted in the table. When a transactional read or transactional write is done, the transactional state table is checked. If any processor or process, other than that which is stored in table 19, attempts to use that transaction ID, then an interrupt will occur or another mechanism for aborting the process will be performed.

Figure 11A:
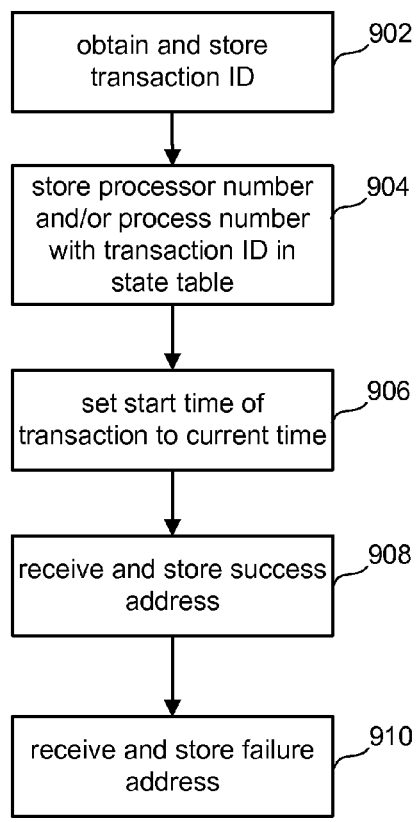
FIG. 11A is a flow chart describing one embodiment of a process for starting transactions and providing security.
Figure 11B:
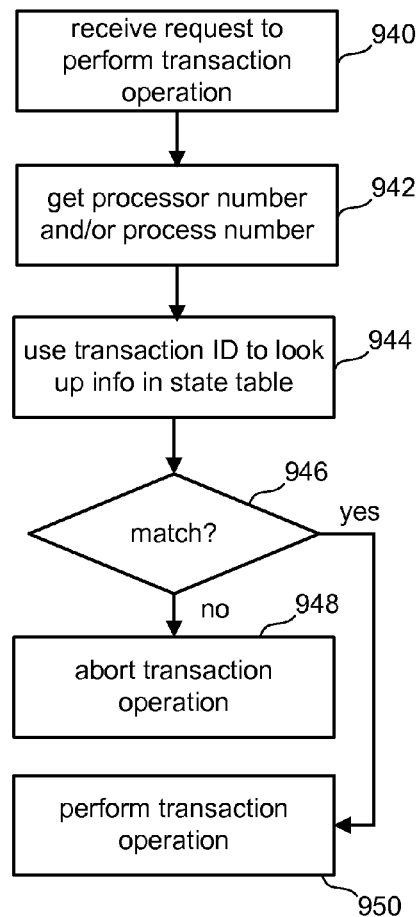
FIG. 11B is a flow chart describing one embodiment of a process for performing transaction operations and providing security.

Looking back at FIG. 3, Transaction Module 200 includes a transaction security circuit 218 in communication with transaction control circuit 204 and state table 219. FIGS. 11A and 11B provide flow charts describing the operation of transaction security circuit 218.

The process of FIG. 11A is performed at the start of a transaction and can be used to replace the process of FIG. 6A. In step 902, transaction module circuit 200 obtains and stores a transaction ID. Step 904, transaction security circuit 218 obtains the processor number and/or process number for the process providing the transaction and will store those values, along with the transaction ID in state table 219. In step 906, the start time of the transaction will be set to the current time, similar to step 404 of FIG. 6A. In step 908, the success address will be received and stored (step 406). In step 910, the failure address will be received and stored (step 408).

FIG. 11B is a flow chart describing one embodiment of a process performed when a transactional write, transactional read or commit request is made. In step 940, the transaction request is received with a transaction ID. The transaction request can include a transactional write, transactional read or commit. In step 942, transaction security circuit 218 will obtain the processor number and/or process number that requested the transactional read, transactional write or commit. In step 944, the transaction ID will be used to access State Table 219 to obtain the appropriate processor number and/or process number. In step 946, the obtained processor number and/or process number will be compared to the numbers obtained in step 942. If the numbers do not match, the request is aborted in step 948. If the numbers match, the request will be performed in step 950 by performing the processes in FIGS. 6B, 6C or 6E.

Another example implementation is presented below. The example implementation includes support for 64 bit addressing in the CPU, L1 cache and an L2 cache with the same size cacheline, an L3 cache which has large cachelines, threads do not migrate to a different CPU (transactions start and end on same CPU), the master clock (mclk) is the highest frequency clock associated with memory, the limit on the length of a memory transaction is 16K*256 mclks, there is a 15 bit current time counter which increments every 256 mclks and there is no timestamp in main memory.

When starting a transaction, the CPU obtains a transaction ID from a hardware engine that maintains a pool of transaction ID's in a locked portion of the L3 cache. When a memory transaction is started, the next transaction ID is allocated. When a memory transaction is committed, the transaction ID is returned to the pool. The CPU sets the fail point by maintaining an array of fail points referenced by transaction ID in memory and the CPU uses transaction ID to set the appropriate location in the array. The CPU does not set succeed point, it's the fall through point after the commit. The CPU sets the transaction start time by maintaining an array of start times referenced by the transaction ID in memory, reading current time and using the transaction ID to set the appropriate location in the array Transactional accesses are identified with the address. A high order memory bit is set to identify transaction versus "real" (non-transactional) accesses. Some upper bits of the address are set to the transaction ID. The CPU may use its existing address calculation capabilities to create the addresses.

The caches are used to hold transactional write data (temporary memory), which maintain a 15 bit field for the timestamp or the transaction ID in each line in the L1 cache, L2 cache and L3 cache. A trolling hardware engine is used to update all timestamps at least every 7K*256 mclks. Timestamps are also updated with any regular write. A single bit flag indicate transactional versus non-transactional data. When a regular read or regular write is performed, the transactional cachelines are ignored. When a transactional read or write is performed, the transaction ID is used, in addition to the address, to determine whether a cache hit has occurred.

A portion of the L3 cache is locked and holds the read list. A separate buffer is kept for each possible transaction ID. The first part of each buffer is always resident in memory. A list of available memory pages for overflow is also kept. If more memory is needed, then the software is interrupted. The head of the read list (a buffer) contains any bookkeeping info; for example, the pointers to the next linked buffer, the pointer to the next open location, the number of valid entries, and any pointers used to troll for duplicates. Each entry consists of a valid flag, a write flag and a cacheline address. A hardware engine updates the read list during a transactional read or transactional write such that a transactional read to "standard" memory adds an entry and a transactional write to a new address adds an entry. A hardware engine eliminates duplicates in the background by trolling the read list a cachline at a time, starting on ½ cacheline boundaries, sorting addresses and eliminating duplicates.

A hardware engine is used to handle the commits. Each CPU sends a commit request to the hardware engine which arbitrates between the requests. The hardware engine broadcasts an atomic control request, waits for a response, broadcasts the transaction start time, broadcasts all addresses in the read list, and then observes responses. If there is a failure, the thread of execution flows to the fail point. If the transaction is successful, then transactional write data is broadcast to all memories and then execution of the application continues. In addition, atomic control is released after the writes have completed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

I claim:

1. A computing apparatus, comprising:
    a main memory system;
    multiple processing units in communication with said main memory system, said processing units execute software that performs transactions of memory accesses for said main memory system, said transactions include transactional write operations and transactional read operations;
    a transaction processing control circuit that is physically separate from and in communication with said multiple processing units, said transaction processing control circuit is dedicated to controlling transaction processing;
    a first memory circuit that is separate physically from and in communication with said transaction processing circuit, said first memory circuit is physically separate from the main memory system, said transaction processing circuit stores temporary write data in said first memory circuit in response to transactional write operations, said first memory circuit is dedicated to storing write data and write addresses in response to transactional write operations; and
    a second memory circuit that is physically separate from and in communication with said transaction processing circuit, said second memory circuit is physically separate from the main memory system and the first memory circuit, said second memory circuit stores a set of timestamps, each timestamp of said set of timestamps is associated with data for said main memory system, said transactional processing system commits a particular transaction by determining whether a set of one or more timestamps stored in said second memory circuit that correspond to transactional reads for said particular transaction are prior to a start time for said particular transaction, said transactional processing system writes data from said first memory circuit corresponding to transaction writes for said particular transaction to said main memory system if said set of one or more timestamps stored in said second memory system that correspond to transactional reads for said particular transaction are prior to said start time for said particular transaction.

2. A computing apparatus according to claim 1, further comprising:
    a third memory circuit storing transaction staff times including said start time for said particular transaction, said third memory circuit is physically separate from the main memory system; and
    an interface circuit connected to said transaction processing control circuit and said multiple processing units.

3. A computing apparatus according to claim 1, wherein:
    each timestamp in said second memory circuit corresponds to multiple data entries in said main memory system.

4. A computing apparatus according to claim 1, wherein:
    said main memory system is grouped into blocks of memory;
    each block of memory stores multiple data entries; and
    said second memory circuit stores multiple timestamps for each block of memory that can be individually and dynamically configured to correspond to different subsets of a corresponding block.

5. A computing apparatus according to claim 1, further comprising:
a third memory circuit in communication with said transaction processing control circuit, said third memory circuit stores identifications of transactions and stores identifications of processing units allowed to access said transactions, said transaction processing control circuit prevents access to transactions for processing units not identified for a particular transaction in said third memory circuit, said third memory circuit is physically separate from the main memory system.

6. A computing apparatus according to claim 1, wherein:
said first memory circuit stores transactional write addresses; and
each transactional write address includes a first set of bits and a second set of bits, said first set of bits identifies an address in said main memory system, said second set of bits identifies one transaction.

7. A computing apparatus according to claim 1, wherein:
said first memory circuit stores transactional write addresses;
each transactional write address includes a first set of bits, a second set of bits and a third set of bits;
said first set of bits identifies an address in said main memory system;
said second set of bits identifies whether an operation is transactional; and
said third set of bits identifies one transaction.

8. A computing apparatus according to claim 1, further comprising:
a cache system that is separate from and in communication with said main memory system and said transaction processing control circuit, said timestamps are only maintained for data in said cache system.

9. A computing apparatus according to claim 1, wherein:
said first memory circuit is part of a cache system; and
at least a subset of entries in said cache system include a memory address, a transaction identification, a transaction flag, a cache tag and data.

10. A computing apparatus according to claim 1, wherein:
said first memory circuit is part of a cache system; and
at least a subset of entries in said cache system include a memory address, a time stamp, a cache tag and data.

11. A computing apparatus according to claim 1, further comprising:
a timestamp adjustment control circuit in communication with said second memory circuit, said timestamp adjustment control circuit automatically adjusts existing timestamps stored in said second memory circuit to be older than current time but not older than a predetermined adjustment period before the current time, said timestamp adjustment control circuit is physically separate from the processing units.

12. A method performed by a computing system that performs transactions of memory accesses, said transactions includes transactional writes and transactional reads, said method comprising:
storing read addresses in response to transactional reads;
storing write data in a temporary condition in response to transactional writes, said storing write data in said temporary condition is performed by hardware that is not operating in response to host software instructions requesting storage of said write data in said temporary condition;
using hardware to create timestamps and associate said timestamps with memory, said timestamps are not referenced by software; and
committing transactions, said committing transactions is performed by hardware without software in said computing system checking other processes' data to avoid collisions of memory accesses, said storing write data in said temporary condition and said committing transactions are performed in a manner that is transparent to said software.

13. A method according to claim 12, wherein:
committing said particular transaction includes taking atomic control of said computing system and determining whether timestamps for all transactional reads for said particular transaction are prior to a staff time for said particular transaction and, if so, moving said write data from said temporary condition to a standard;
said temporary condition includes storage of said write data in a first storage device; and
said standard condition includes storage of said write data in a second storage device, the second storage device is physically separate from the first storage device.

14. A method according to claim 12, further comprising:
preventing access to data for transactional writes and transactional reads associated with a particular transaction for entities that did not request creation of said particular transaction.

15. A method according to claim 12, further comprising:
determining whether existing timestamps for data are within a window of a current time; and
automatically adjusting existing timestamps determined to not be within the window of the current time, said automatically adjusting includes changing timing information to reflect a time prior to the current time.

16. A method according to claim 12, wherein:
said write data and said time stamps are stored in a multi-level cache system;
said storing write data includes storing a transaction flag in said cache system indicating that said write data is for a transactional write and storing a transaction identification in said cache system identifying a transaction associated with write data; and
said committing transactions includes allowing said write data to move from said cache system to main memory.

17. A computing apparatus, comprising:
a main memory;
multiple processing units in communication with said main memory system, said processing units execute software that performs transactions of memory accesses for said main memory, said transactions includes transactional reads and transactional writes;
an interface circuit in communication with and physically separate from said processing units and said main memory;
a transactional control circuit in communication with said interface circuit, said transactional control circuit is physically separate from the multiple processing units;
a first memory circuit that is physically separate from and in communication with said transactional control circuit, said first memory circuit stores transactional start times, said first memory circuit is physically separate from said main memory;
a second memory circuit that is physically separate from and in communication with said transactional control circuit, said second memory circuit stores transactional identifications, said second memory circuit is physically separate from said main memory and said first memory circuit;

a third memory circuit that is physically separate from and in communication with said transactional control circuit, said third memory circuit stores transactional read addresses, said third memory circuit is physically separate from said main memory and the first memory circuit;

a fourth memory circuit that is physically separate from and in communication with said transactional control circuit, said fourth memory circuit stores transactional write addresses and transactional write data, said fourth memory circuit is physically separate from said main memory; and a fifth memory circuit that is physically separate from and in communication with said transactional control circuit, said fifth memory circuit stores timestamps associated with said main memory system, said fifth memory circuit is physically separate from said main memory, said transactional control circuit commits a particular transaction by determining whether a set of one or more timestamps stored in said fifth memory circuit that correspond to one or more transactional reads for said particular transaction are prior to a start time for said particular transaction, said transactional control circuit writes data from said fourth memory circuit corresponding to one or more transactional writes for said particular transaction to said main memory if said set of one or more timestamps stored in said fifth memory circuit that correspond to said one or more transactional reads for said particular transaction are prior to said start time for said particular transaction.

18. A computing apparatus according to claim 17, wherein:
said main memory is grouped into blocks of memory;
each block of memory stores multiple data entries; and
said fifth memory circuit stores multiple timestamps for each block of memory, the timestamps can be individually and dynamically configured by said transactional control circuit to correspond to different subsets of a corresponding block.

19. A computing apparatus according to claim 17, further comprising:
a sixth memory circuit that is separate from and in communication with said transactional control circuit, said sixth memory circuit stores correspondence between transactions and entities that request transactions.

20. A computing apparatus according to claim 17, wherein:
said fourth memory circuit that stores transactional write addresses and transactional write data are part of a cache system.

\* \* \* \* \*